(12) United States Patent
Kuhn et al.

(10) Patent No.: US 9,174,866 B2
(45) Date of Patent: Nov. 3, 2015

(54) METHOD FOR CONTINUOUS PRINTING OF PRECISION STRUCTURES ON A GLASS RIBBON, AND GLASS RIBBON THUS OBTAINED

(75) Inventors: Wolf Stefan Kuhn, Maisons Alfort (FR); François Pahmer, Maisons Alfort (FR)

(73) Assignee: FIVES STEIN (FR)

( * ) Notice: Subject to any disclaimer, the term of this patent is extended or adjusted under 35 U.S.C. 154(b) by 653 days.

(21) Appl. No.: 13/510,078

(22) PCT Filed: Nov. 3, 2010

(86) PCT No.: PCT/IB2010/054977
§ 371 (c)(1),
(2), (4) Date: Jul. 30, 2012

(87) PCT Pub. No.: WO2011/061653
PCT Pub. Date: May 26, 2011

(65) Prior Publication Data
US 2012/0282438 A1    Nov. 8, 2012

(30) Foreign Application Priority Data
Nov. 19, 2009 (FR) ..................... 09 05554

(51) Int. Cl.
*C03B 13/08* (2006.01)

(52) U.S. Cl.
CPC ......... *C03B 13/08* (2013.01); *Y10T 428/24479* (2015.01)

(58) Field of Classification Search
CPC ...... C03B 13/08; C03B 23/004; C03B 23/033
USPC .............................................. 65/102
See application file for complete search history.

(56) References Cited

U.S. PATENT DOCUMENTS

| 5,224,978 | A | * | 7/1993 | Hermant et al. | .................. 65/94 |
| 5,987,923 | A | | 11/1999 | Ostendarp et al. | |
| 6,199,404 | B1 | * | 3/2001 | Kawai et al. | .................... 65/102 |
| 6,679,085 | B1 | | 1/2004 | Singer et al. | |
| 2008/0289689 | A1 | * | 11/2008 | Gibson | ........................ 136/258 |

(Continued)

FOREIGN PATENT DOCUMENTS

FR    0493202 A    8/1919
FR    2916901 A1    12/2008

(Continued)

*Primary Examiner* — Matthew Daniels
*Assistant Examiner* — Cynthia Szewczyk
(74) *Attorney, Agent, or Firm* — The Belles Group, P.C.

(57) ABSTRACT

A method for printing a precision structure on the surface of a glass strip advancing continuously at a rate of at least 1 m/min, using an etching roller (27) applying a printing force against the surface to be etched, the structure to be produced including protruding and recessed regions which have radii of curvature, a preliminary thermal conditioning (26 and 32) being performed upstream of the etching roller; the thermal conditioning is designed to ensure a temperature of the strip (J) over the print thickness and a cooling (29) downstream of the etching roller (27) to ensure a controlled fixing of the structure; the method according to the invention making it possible to determine the parameters that are intimately linked for obtaining a particular structure, notably the print temperature, the printing force and the cooling rate, taking into account a degree of creep between the molding radius (R1) and the post-creep radius (R2).

16 Claims, 16 Drawing Sheets

(56) References Cited

U.S. PATENT DOCUMENTS

| | | | |
|---|---|---|---|
| 2009/0038343 A1* | 2/2009 | Gibson | 65/60.1 |
| 2009/0162623 A1* | 6/2009 | Foresti et al. | 428/210 |
| 2010/0154862 A1 | 6/2010 | Schiavoni et al. | |
| 2011/0259052 A1 | 10/2011 | Kuhn | |

FOREIGN PATENT DOCUMENTS

| | | |
|---|---|---|
| FR | 2934587 A1 | 2/2010 |
| FR | 2934588 A1 | 2/2010 |
| WO | WO 2010013149 A1 * | 2/2010 |

* cited by examiner

— Top surface
--- Center temp
××× Bottom surface
····· Temp at print depth

— Top surface
××× Bottom surface

Deformation with R ⇑

Rate fields

METHOD FOR CONTINUOUS PRINTING OF PRECISION STRUCTURES ON A GLASS RIBBON, AND GLASS RIBBON THUS OBTAINED

PRIORITY

Priority is claimed as a national stage application, under 35 U.S.C. §371, to PCT/IB2010/054977, filed Nov. 3, 2010, which claims priority to French Application No. 09/05554, filed Nov. 19, 2009. The disclosures of the aforementioned priority applications are incorporated herein by reference in their entirety.

The invention relates to a method for etching, or printing, precision structures on the surface of a strip or sheet of glass using an etching roller intended for applications requiring high precision.

The precision structure can be produced on one face of the strip or on both its faces.

The preliminary shaping of the glass is performed notably by rolling, drawing or flotation.

The etching is done continuously with rates of advance of the strip of at least 1 m/min and typically 5 m/min for rolled glass and 15 m/min for float glass, for glass approximately 4 mm thick.

Examples of fields of application of the glass obtained according to the invention are given below:
- Light trap structures for photovoltaic cells such as triangular grooves and pyramids
- Structures for radiation concentrators for photovoltaic cells and thermal systems such as grooves or pyramids or parabolic cavities for focusing beams, optical or Fresnel lenses, in transmissive or reflective mode
- Structures for flat screens (microstructures in the form of rectangular channels)
- Architectural field (structures for decorative, optical and electrical functions).

The invention applies most particularly to structures of small dimensions having protruding parts obtained by filling the negative of a matrix, whether it concerns notably pyramids, cones, cylinders, parallelepipeds or grooves. The structures targeted by the invention may have edges, more generally protruding or recessed regions, of which the smallest radius of curvature may be less than 200 µm.

TECHNICAL PROBLEM ADDRESSED BY THE INVENTION

With the known etching methods, it is impossible to create, in line, high precision structures, notably with radii of curvature less than 200 µm for protruding parts such as edges, with a rate of advance of the glass strip greater than 1 m/min.

There are in line structure etching methods with a rate of approximately 1 to 5 m/min, but these structures have, for their protruding parts, large radii of curvature, greater than 200 µm.

STATE OF THE ART

The patent EP0493202 describes a glass with pyramidal pits and its production by a hot rolling method. The patent specifies that the relief of the roller is not in negative on the surface of the glass after its cooling. According to this patent, the stresses introduced into the mass of glass during printing would have a tendency to be relaxed by provoking surface creep. Similarly, the not-inconsiderable thermal inertia of the glass would prevent the surface from being fixed instantaneously.

The patent FR2916901 deals with the production by hot rolling of a textured glass substrate for photovoltaic applications with protruding structures with a radius of curvature of around a millimeter. This patent specifies that the glass does not manage to perfectly fill the patterns present on the rollers.

The U.S. Pat. No. 6,679,085 describes a method for fabricating precision structures in sheets of glass with a structured roller. The energy for heating the glass to an appropriate temperature for printing the structures is provided by heating incorporated in the roller. To increase the rate of advance of the sheets and the rate of forming of the structures, the temperature of the roller is increased. This also increases the heating through the samples which lose their stability and makes it difficult to separate the glass from the roller. The authors indicate an appropriate time for the rate of the roller of 2 mm/s (0.12 m/min). Such a rate is inadequate for the continuous production of float or rolled glass.

The U.S. Pat. No. 5,987,923 describes a method for forming precision structures in moving sheets of glass. To avoid the problem of flow of the structure after forming, the tool runs between two rollers parallel to the sheet of glass. During this time, the tool remains in place in the glass until fixing. In this way, the creep is avoided because the temperature of the tool and of the glass drop during the contact time. The method also targets high productivity. Now, the rates of advance indicated are 0.1-1 m/min. The method is based on a heating of the tool just before and during the contact with the glass. The thermal contact duration and the mechanical pressure when the glass passes under the first roller is too short to allow for sufficient heat transfer for an increase in production to 5 or even 15 m/min. The scrolling of a strip-shaped tool also limits the geometrical choice of the structures to be printed.

The patent FR2934588 describes a method for continuously forming a structure on a strip of float glass, the temperature of which is inadequate for the etching. The invention involves heating a limited thickness of the glass, roughly corresponding to the thickness of the etching, just upstream of the etching roller, by specifying the heating parameters. This patent does not give any indication for defining the printing parameters according to the nature of the structure, notably the temperature of the glass and the force to be exerted by the roller. Nor does it disclose a necessary cooling rate according to the level of creep that can be allowed for the structure.

BRIEF DESCRIPTION OF THE INVENTION

The invention consists of a method and a device for etching a strip of glass that make it possible to produce structures that have edges with a radius of curvature R less than 200 µm.

The invention makes it possible to define and link the optimum operating parameters upstream of the etching roller, at the roller, and downstream of the roller, so as to optimize the overall glass etching method.

Upstream of the etching roller, the invention makes it possible to define the thermal conditioning of the strip that makes it possible to obtain the ideal temperature profile in order to correctly fill the imprints from the roller and allow for a rapid fixing after etching.

At the time of the strip/etching roller contact, the invention makes it possible to define the print temperature, the pressure to be exerted by the roller on the glass and the duration of contact between the roller and the glass according to the preliminary thermal conditioning.

Downstream of the etching roller and depending on the thermal state resulting from the preceding steps, the invention makes it possible to define the necessary cooling rate to obtain the edges with the targeted radii of curvature.

According to the invention, the printing method makes it possible to obtain a precision structure including protruding and recessed regions, of which the smallest radius of curvature (R2) of the protruding regions may be less than 200 μm, on at least one of the faces of a flat glass advancing continuously at a rate of at least 1 m/min, using a structured tool, notably an etching roller. It is characterized in that:
- a thermal conditioning is provided upstream of the printing position to ensure a print temperature $T_{imp}$ for the strip over the print thickness,
- the printing is done with a force FL applied by the structured tool to the glass so as to obtain a radius of curvature (R1) less than (R2) to anticipate the increase in the radius of curvature from (R1) to (R2) associated with the creep after the removal of the structured tool,
- a cooling is done with a cooling rate TR causing the radius (R1) to change to a radius less than or equal to (R2).

The print temperature $T_{imp}$ can be determined by the combination of a diagram (C2) of the filling of the protruding and recessed regions, and a diagram (C3) of the fixing of the imprints.

Advantageously, the radius (R1) is obtained by totally filling the etching of the print tool with glass.

Preferably, according to the method:
- a limited degree of creep x %=(R2−R1)/R2 is chosen, less than or equal to 50%, advantageously less than 20% and preferably less than or equal to 10%;
- then, a printing force FL that is technically easy to produce is chosen;
- with a curve ($G_{imp}$) of the filling diagram (C2), representing the temperature/linear force pairings that make it possible to obtain the desired final radius of curvature R2, the print temperature $T_{imp}$ is found;
- with a curve ($G_{flux}$) of the fixing diagram (C3), representing the cooling rate/temperature limit pairings that make it possible to obtain the TR to be produced for the print temperature $T_{imp}$.

The value of the rate of creep x % is advantageously chosen such that the values of $T_{imp}$, FL and TR can be produced on the installation according to its heating, printing force and cooling rate capabilities.

The radius R2, corresponding to the increase in the radius of curvature (R1) by creep, can be estimated by the following formula:

$$R2 = R1 + C_{tot} \cdot \frac{\gamma}{\mu(T_{imp})} \cdot \frac{F_{vis}}{TR} \cdot \ln(2)$$

γ being the surface tension,
R1 is the initial radius of curvature of the print,
R2 is the radius of curvature after increase,
$C_{tot}$ is a representative coefficient for the creep of a particular structure
$F_{vis}$ is a constant
μ represents the viscosity
TR represents the cooling rate,
ln(2) is the neperian logarithm of 2.

For a constant temperature, and therefore a constant viscosity, the radius R2 is given by a simplified form of the creep formula $$R2 = R1 + C_{tot} \cdot \frac{\gamma}{\mu} \cdot \Delta t$$

such that a creep measurement during a time period Δt on a material with a known ratio γ/μ makes it possible to determine the coefficient $C_{tot}$ of a particular structure.

The representative coefficient $C_{tot}$ for the creep of a particular structure can be determined by the formula:

$$C_{tot} = F_{RL} \cdot \frac{C_{geo}}{R}$$

in which the radius R is a factor which characterizes the size of the structure, $C_{geo}$ the shape and $F_{RL}$ the limiting conditions for the creep of a particular edge.

The coefficient $C_{tot}$ can be taken to be equal to 0.4 for a structure of sinusoidal form.

The cooling rate TR, which leads to a targeted degree of creep x %=(R2−R1)/R2 between R1 and R2, can be determined by the following formula, for a given structure, as a function of the print temperature $T_{imp}$ $$TR = C_{tot} \cdot \frac{\gamma}{\mu(T_{imp})} \cdot \frac{F_{vis}}{R2 \cdot x\%} \cdot \ln(2)$$

γ being the surface tension,
R1 is the initial radius of curvature of the print,
R2 is the radius of curvature after increase,
$C_{tot}$ is a representative coefficient for the creep of a particular structure
$F_{vis}$ is a constant
μ represents the viscosity, and ln(2) is the neperian logarithm of 2.

The limit curve ($G_{imp}$) corresponding to the pairs of values (temperature/linear force) that make it possible to obtain the desired radius of curvature, before glass creep, can be established with a paste, in particular a dental imprint paste, having a viscosity close to that of the glass at the print temperature, but with a surface tension lower than that of the glass at this print temperature.

Advantageously, the preliminary thermal conditioning is determined to ensure, in the strip, at the level of the etching roller, a temperature gradient of at least 10° C. between the hotter surface to be etched and the less hot mid-thickness of this glass strip.

According to the method, to etch a strip of float glass, the thermal conditioning ensures heating of the face to be etched to bring it to a print temperature greater than that of the core of the strip.

To etch a strip of rolled glass, the thermal conditioning ensures a cooling of the strip on the face opposite the one having to be etched, to cool the core of the strip.

The temperature profile obtained in the thickness of the glass after the thermal conditioning is generally decreasing from the face to be etched to the opposite face.

As a variant, the temperature profile obtained in the thickness of the glass may be uniform over the thickness.

The invention also relates to a strip of float or rolled glass, or sheet of glass, characterized in that it includes a precision structure obtained by a method as defined above.

The invention also relates to a print device making it possible to obtain a precision structure including protruding and recessed regions, of which the smallest radius of curvature (R2) of the protruding regions may be less than 200 µm, on at least one of the faces of a flat glass advancing continuously at a rate of at least 1 m/min, implementing a method as defined above, characterized in that it comprises:
- a thermal conditioning area,
- a structured tool for etching the glass,
- a surface cooling device.

Apart from the provisions set out above, the invention consists of a certain number of other provisions that will be more explicitly involved with hereinbelow with regard to exemplary embodiments described with reference to the appended drawings, but which are by no means limiting. In these drawings.

Figure 3:
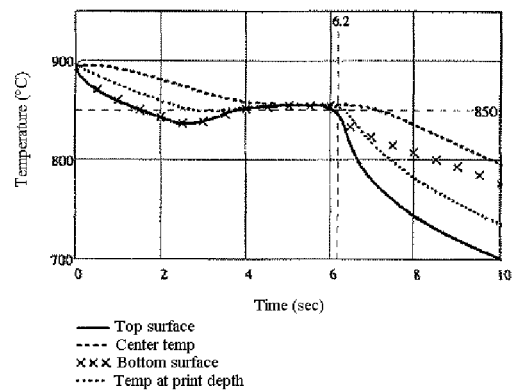
Figure 4:
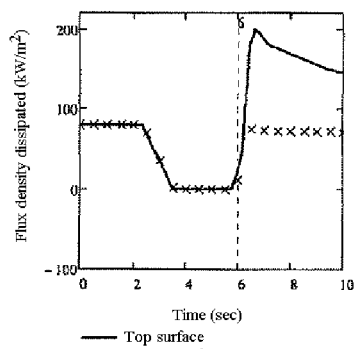
Figure 5:
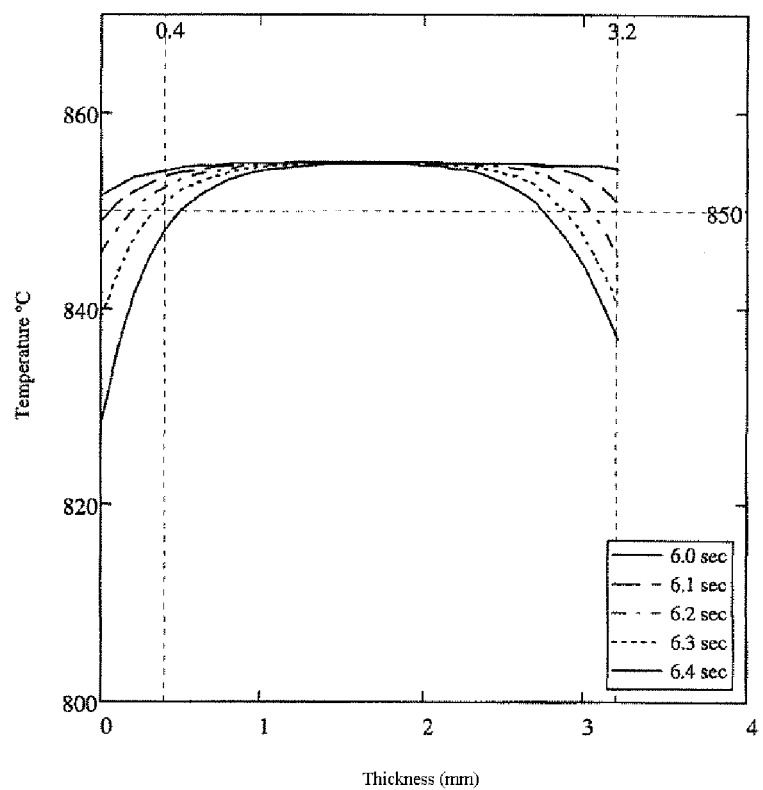

FIGS. 3, 4 and 5 relate to the case of a thermal conditioning by making the temperature uniform in the thickness of the strip by an insulation produced upstream of the printing point situated at 6 seconds, followed by a forced cooling.

FIG. 3 represents the trend of the temperatures of a strip of glass on its faces (solid line curve and crosspoints), at the center (top dashed curve) and at the print depth (intermediate dotted curve).

FIG. 4 illustrates the trend of the thermal flux densities on the y axis, as a function of time on the x axis.

FIG. 5 is a graph of the temperatures in the thickness of the strip, at different instants, the temperature being given on the y axis and the thickness on the x axis from a face corresponding to the x axis 0.

Figure 6:
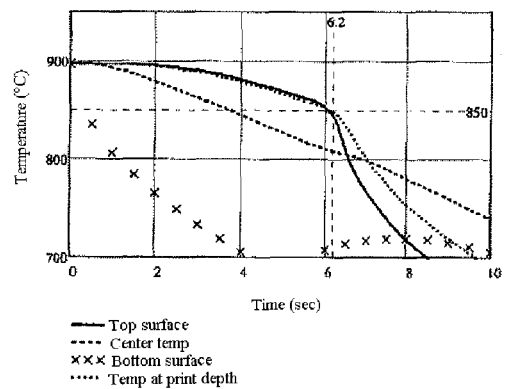
Figure 7:
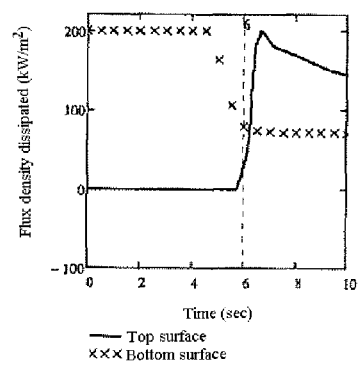
Figure 8:
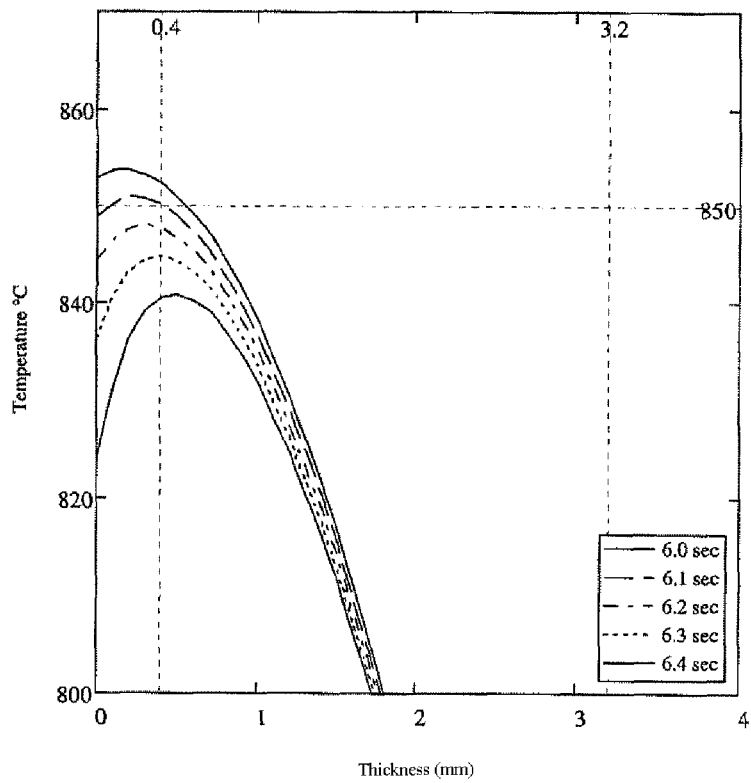

FIGS. 6, 7 and 8 are curves similar to those of FIGS. 3, 4 and 5. These figures relate to the case of a thermal conditioning resulting in the creation of a thermal gradient in the thickness of the strip by the combination of an insulation of the face to be etched and a cooling on the opposite face, produced upstream of the printing point situated at 6 seconds, followed by a forced cooling.

Figure 9:
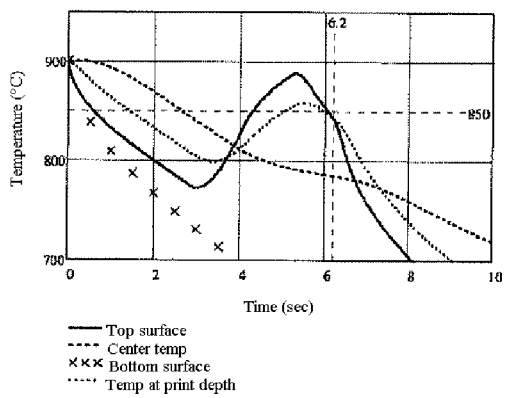
Figure 10:
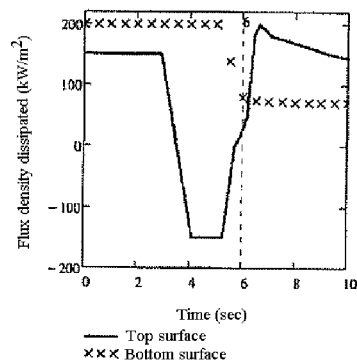
Figure 11:
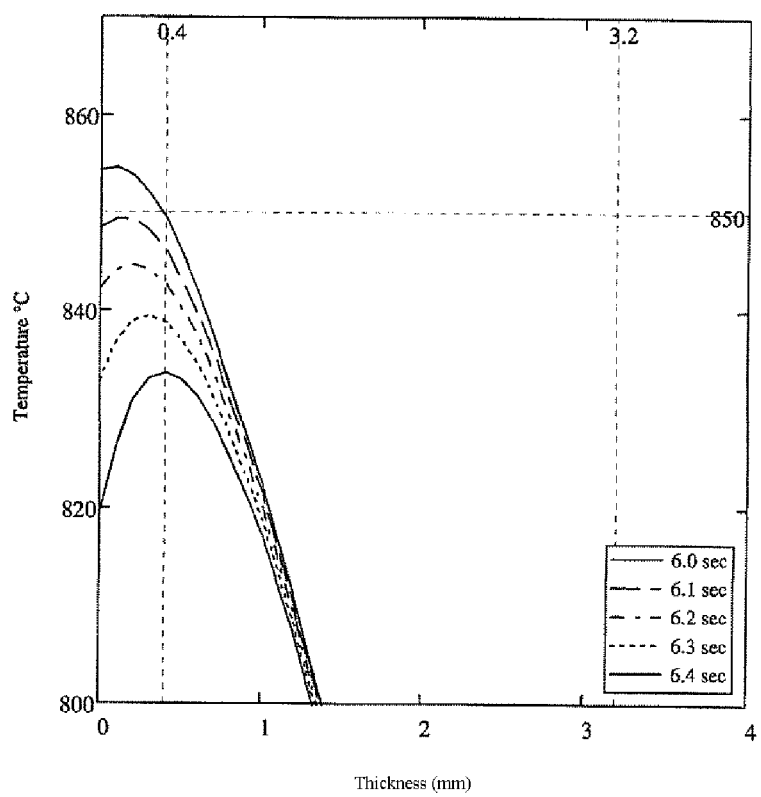

FIGS. 9, 10 and 11 are curves similar to those of FIGS. 6, 7 and 8. These figures relate to the case of a thermal conditioning resulting in the creation of a thermal gradient in the thickness of the strip by the combination of a top-up heating of the face to be etched and a cooling on the opposite face, produced upstream of the printing point situated at 6 seconds, followed by a forced cooling.

Figure 12:
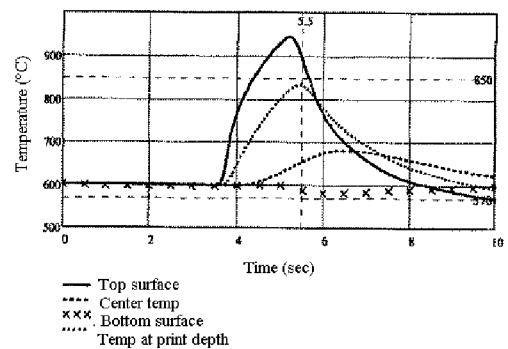
Figure 13:
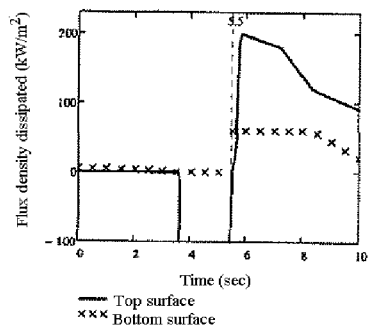
Figure 14:
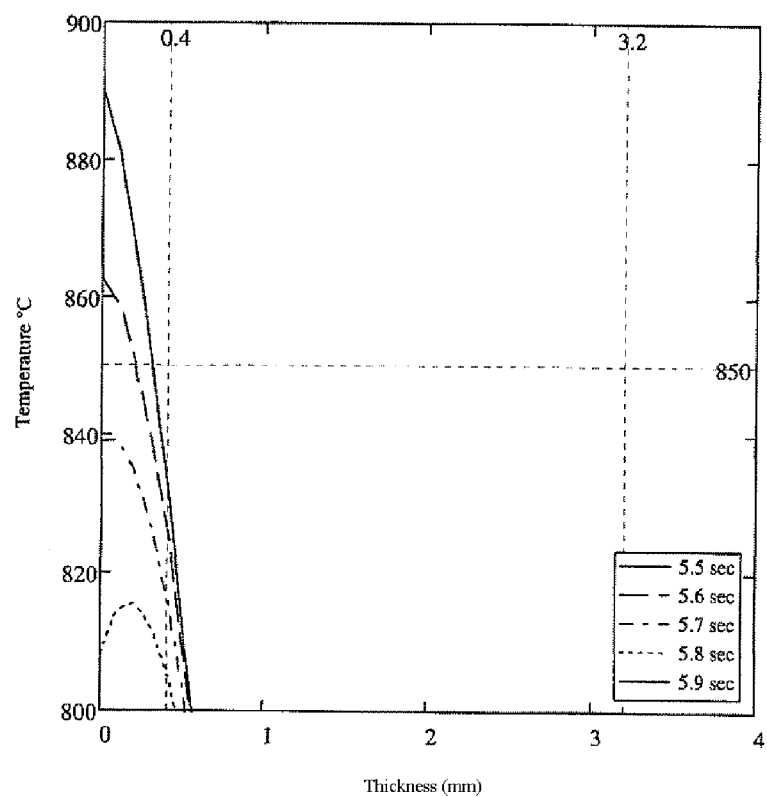

FIGS. 12, 13 and 14 are curves similar to those of FIGS. 6, 7 and 8 but this time relate to the case of a float glass. A thermal conditioning results in the creation of a thermal gradient in the thickness of the strip by the combination of an intense heating of the face to be etched and a cooling on the opposite face, produced upstream of the printing point situated at 6 seconds, followed by a forced cooling.

Figure 15:
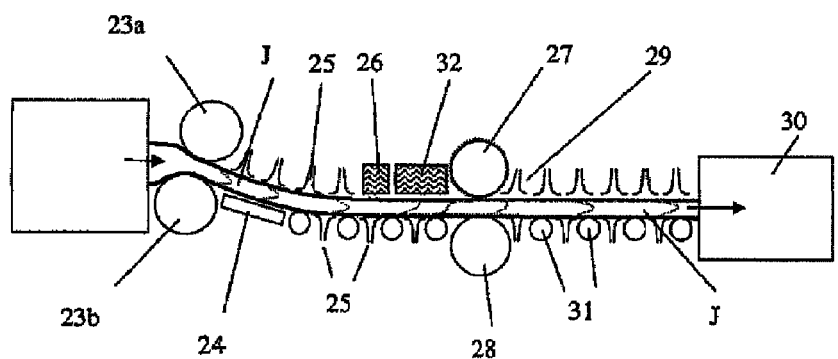

FIG. 15 is a diagram in vertical cross section of an installation according to the invention.

Figure 16:
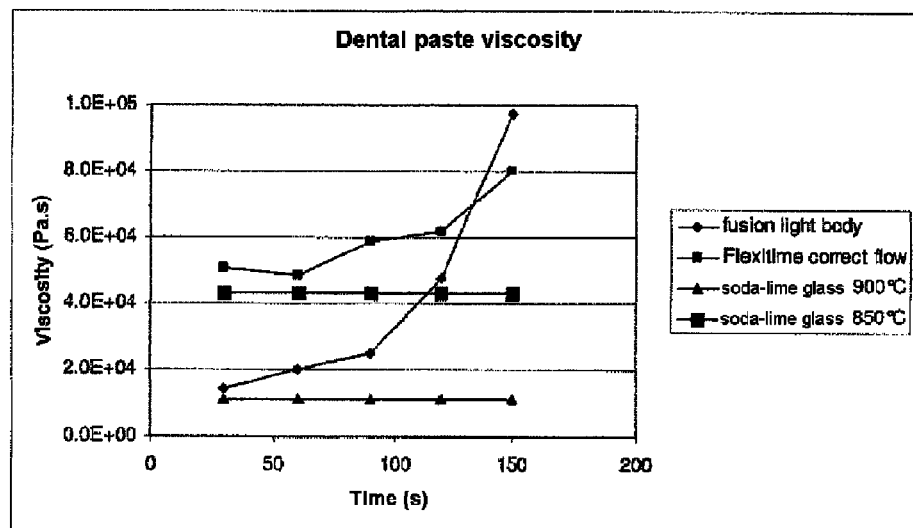

FIG. 16 is a diagram representing the variation of the viscosity on the y axis as a function of time on the x axis for two types of pastes and soda-lime glass at two different temperatures.

Figure 17:
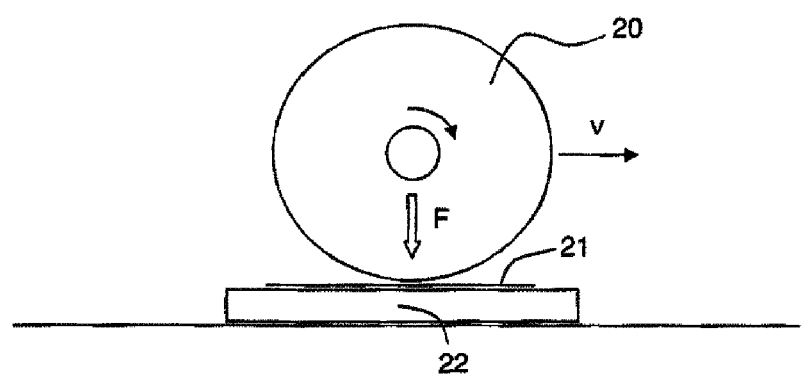

FIG. 17 is a diagram of a rig for testing etching on a sheet of paste.

Figure 18:
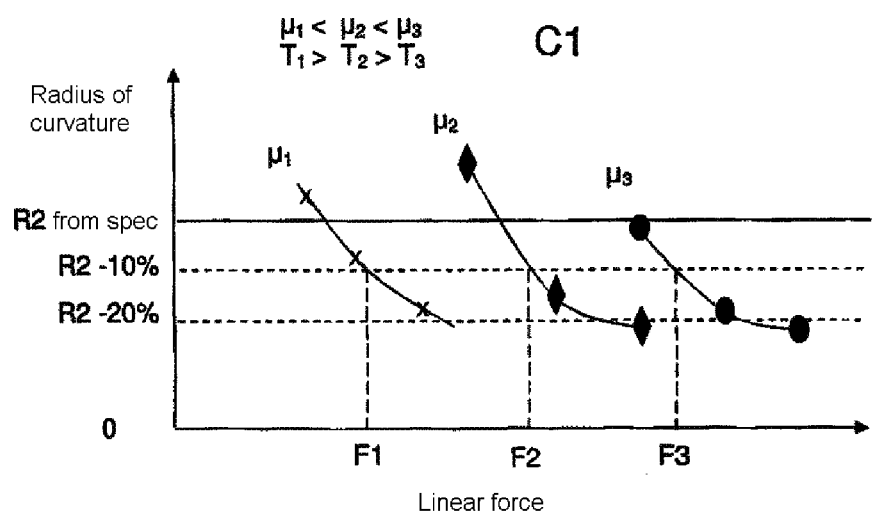

FIG. 18 is a diagram of print quality of a given structure called C1, formed from a family of curves obtained for different constant viscosities representing the variation of the radius of curvature of an imprint, on the y axis, as a function of the linear printing force exerted by an etching roller.

Figure 19:
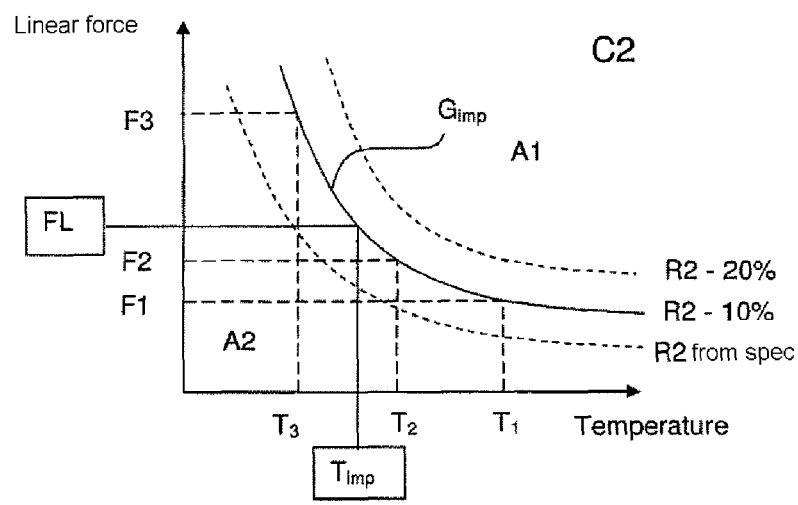

FIG. 19 is a diagram representing the variation of the linear printing force called C2, on the y axis, applied by an etching roller, as a function of the print temperature of the glass on the x axis, for different values of the radius of curvature R1 before creep.

Figure 20:
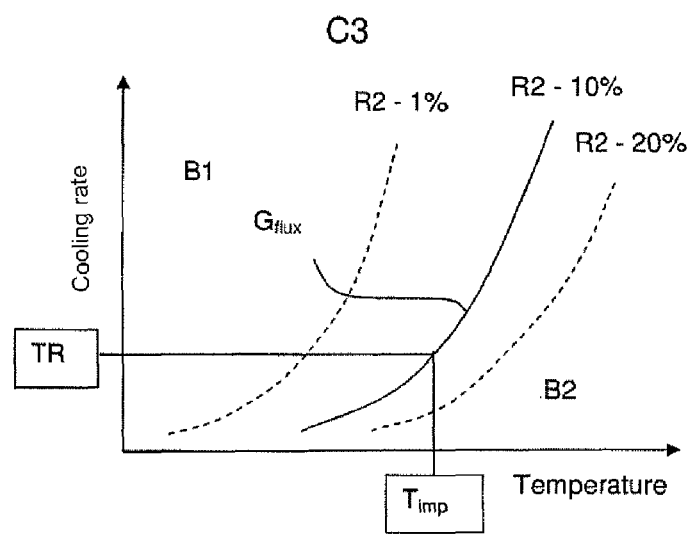

FIG. 20 is a diagram formed from a family of curves giving the rate of cooling called C3, on the y axis, as a function of the print temperature on the x axis, for different increases in radius of curvature by creep until a fixing leading to a same radius R2.

Figure 21:
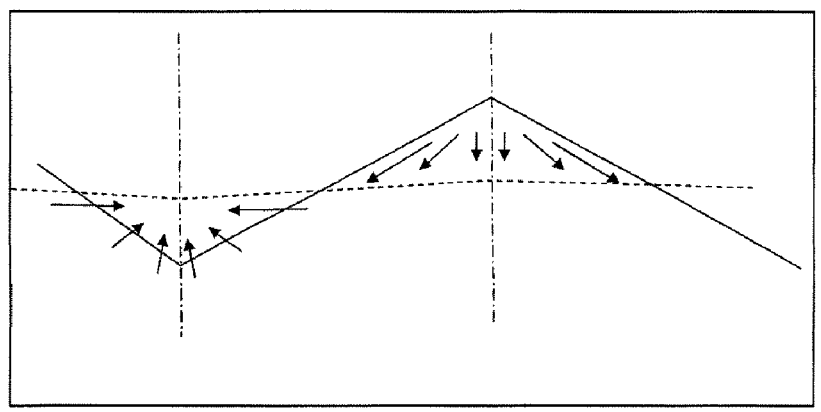

FIG. 21 is a diagram illustrating the displacement of the glass because of the surface tensions in a strip of glass etched with triangular grooves.

Figure 22:
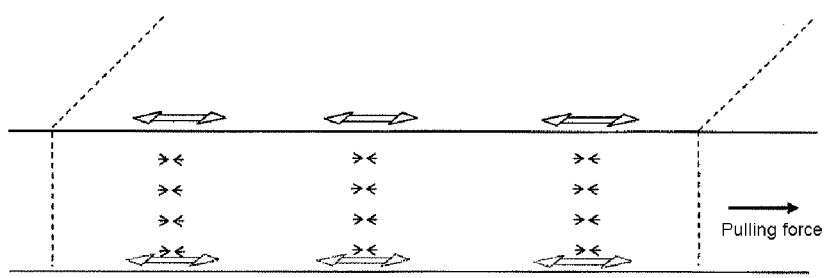

FIG. 22 is a perspective diagram of a section of glass strip without structuring in which are represented volume compression tensions induced by the surface tension, the representation being partial and in perspective.

Figure 23:
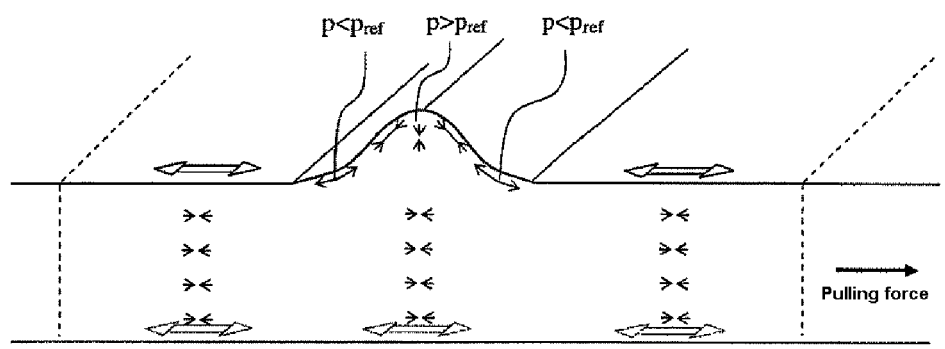

FIG. 23 is a diagram similar to that of FIG. 22 with a protuberance formed by a transversal ripple which induces additional tensions and compressions.

Figure 24:
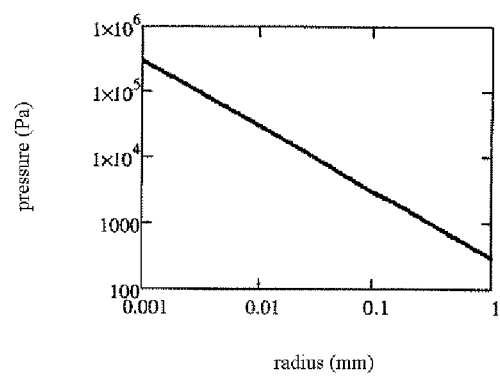

FIG. 24 is a diagram which shows the trend of the pressure as a function of the radius of curvature.

Figure 25:
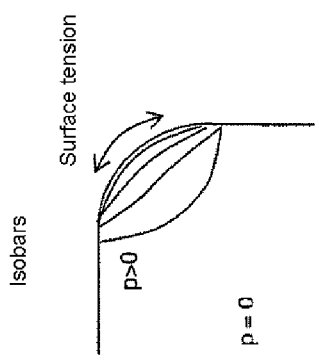

FIG. 25 is a diagram of the edge of a structure, with radius of curvature, showing isobars in the glass.

Figure 26:
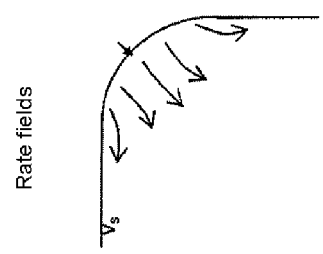

FIG. 26 shows, in a way similar to FIG. 25, a rate field in the region with radius of curvature undergoing a deformation.

Figure 27:
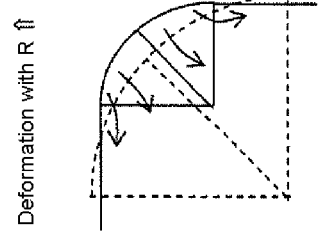

FIG. 27 illustrates the deformation of the region with radius of curvature following creep.

Figure 28:
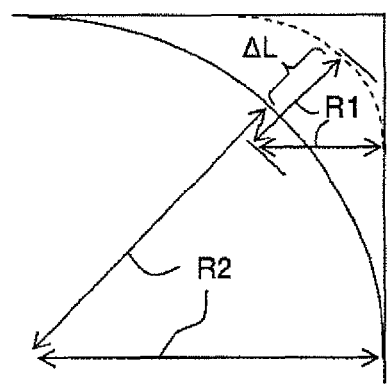

FIG. 28 is a geometrical illustration of the deformation of the structure by creep with variation of the radius of curvature.

Figure 29:
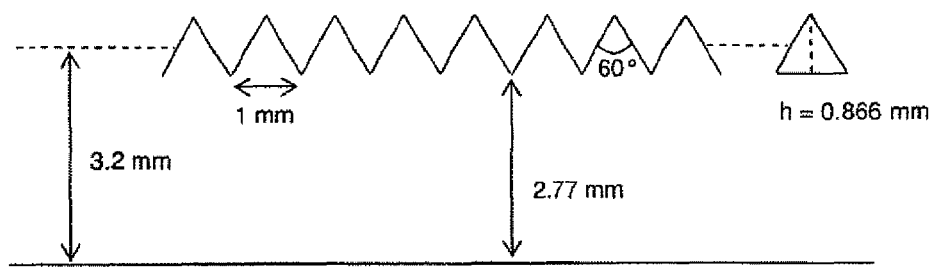
Figure 30:
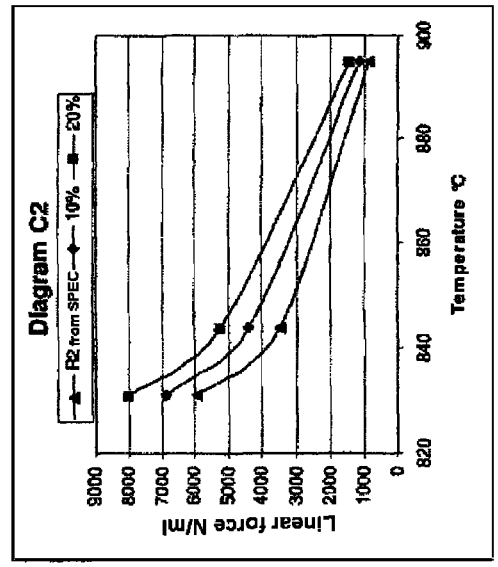
Figure 30:
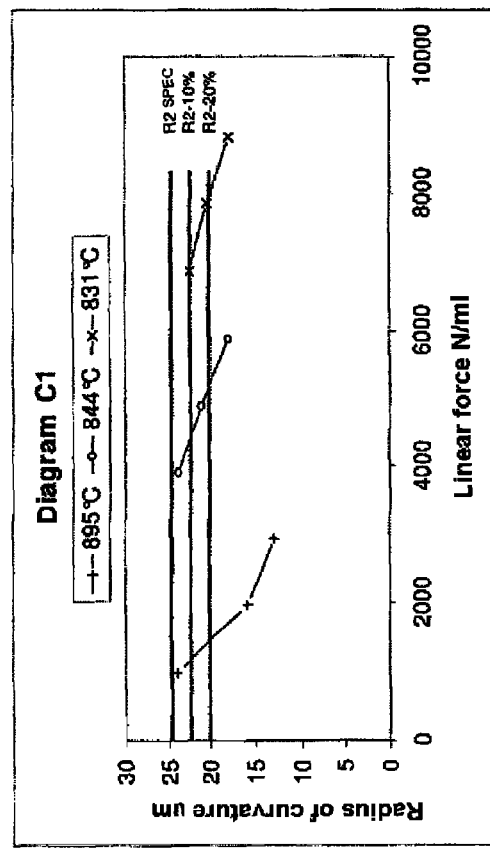
Figure 31:
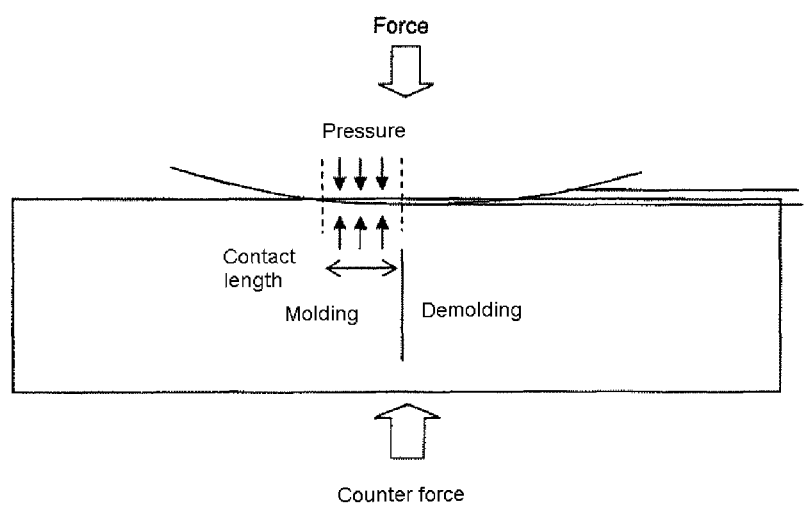
Figure 32:
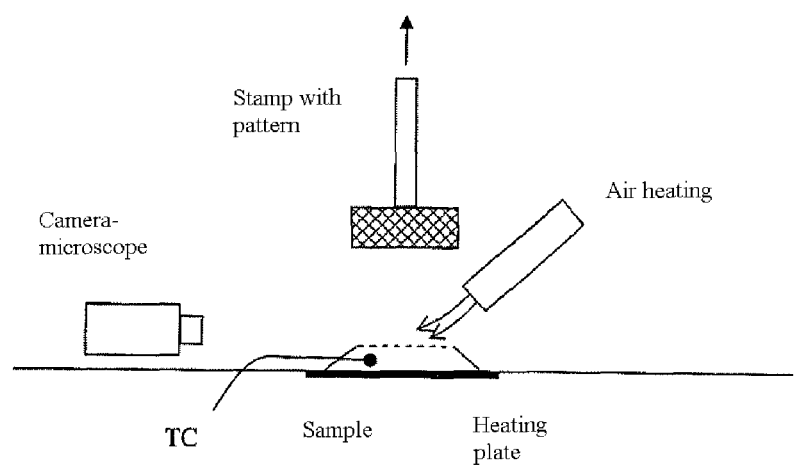
Figure 33:
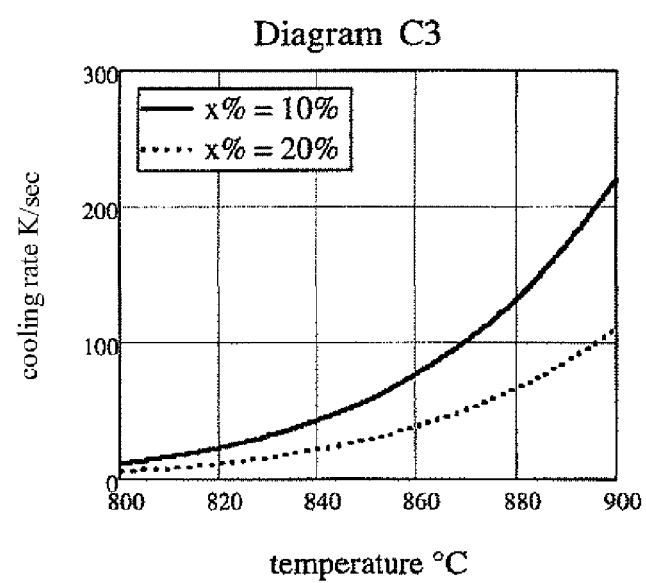

FIG. 29 is a partial schematic illustration of a structure in triangular grooves, FIG. 30 comprises the diagrams C1 and C2 of the exemplary application of the invention, FIG. 31 is a schematic illustration of a contact of an etching roller with a sheet of glass, FIG. 32 is a schematic representation of a cold creep test, and FIG. 33 represents the diagram C3 of the exemplary application.

DETAILED DESCRIPTION OF THE INVENTION

The quality of the edges is an essential element for numerous structures. It is difficult to retain after forming because of the creep.

An edge can be considered to be a curved surface with a small radius of curvature. The radius of curvature is thus a good indicator of the quality of a structure.

Preliminary Thermal Conditioning Step

The invention makes it possible to define the temperature $T_{imp}$ necessary on the face to be etched that allows for a good filling of the relief of the etching roller and the temperature profile in the thickness of the glass favoring cooling after printing.

$$T(0 < x \leq d_{imp}) \approx T_{imp}$$

In this formula, $d_{imp}$ is representative of the depth of glass to be deformed during etching. Thus, $T(0<x\leq d_{imp})$ expresses the temperature in this same thickness of glass.

The thermal conditioning according to the invention makes it possible to obtain the desired temperature over the print thickness at the moment of etching and, if necessary, the temperature gradient in the thickness of the glass.

The initial state of the strip is intimately linked to its preparation method.

In the case of rolled glass, the strip leaves the rolling rollers at approximately 850° C.-950° C. with a strong temperature gradient in the thickness of the glass because the rolling rollers are cooled. The temperature at the core of the strip is much higher than at the surface. There is thus a positive temperature gradient from the surface to the core of the strip. gradT>0

In the case of float glass, the strip leaves the tin bath at approximately 600° C. with a moderate positive temperature gradient in the thickness of the glass.

The preliminary thermal conditioning according to the invention is thus suited to the way in which the strip is prepared. It will thus consist in cooling or heating the glass according to its initial state.

According to the invention, the preliminary thermal conditioning may make it possible to create a temperature profile in the thickness of the glass which contributes significantly to the rigidity of the strip and to the rate of cooling of the glass after the etching.

The temperature profile obtained in the thickness of the glass after the thermal conditioning may thus be uniform over the thickness, or be more or less decreasing from the face to be etched to the opposite face. gradT≤0

In the case of a strip obtained by rolling, the object is mainly to avoid having a reserve of calories present in the thickness of the glass.

In the case of a strip obtained by flotation, the aim is primarily to raise only the surface temperature of the face to be printed which has the advantage of creating a temperature gradient that favors cooling after printing. This also offers the advantage of conserving the rigidity of the strip which facilitates transportation on the rollers and limits the reduction of the thickness of the strip by the force applied during printing.

The optimization of the thermal state of the strip at the end of thermal conditioning is thus obtained by taking into account all the precision structure etching method, from the preliminary thermal conditioning to the post-print cooling.

In the case of a strip of float glass in which the face to be printed must be heated to reach the print temperature, the heating method and device may be produced as taught by the patent FR2934588.

In the case of rolled glass and the demand for homogenization of the strip in the thickness at the print temperature, notably under the face to be printed, said face is thermally insulated over a length equivalent to approximately 2 sec (length=strip rate/2 sec) for a thickness of 3-4 mm. For different thicknesses, a calculation of the homogenization time with the Péclet number suited to the two dimensions makes it possible to determine the length for homogenization (2D Péclet number, cf. FR2934587).

In the case of rolled glass, the thermal insulation of the strip also makes it possible to obtain the strip at the right temperature targeted for the printing even if the printing is relatively distant from the rolling machine. It is even advantageous to opt for a good distance from the printing—for example at a position where the strip is naturally cooled to approximately 700° C. The length of the insulated region will then be adapted according to the targeted print temperature.

In the case where the method demands a temperature difference ΔT to limit the crushing or a gradient to reinforce cooling, the temperature of the rolled strip is first lowered to the required volume temperature, for example to 650° C., and only the surface to be etched is reheated. The heating of the surface is engineered according to the rules disclosed in the patent FR2934588.

To design a thermal conditioning which contributes to the cooling, it will be necessary to quantify the cooling by the volume of the glass. We will deal with this issue later in the cooling rate section.

Printing Step

An important step in obtaining a precision structure in the glass consists of the filling of the structure etched into the surface of the tool such as a steel roller. The shapes and dimensions of such structures may vary widely. The structures targeted have, for example, characteristic dimensions of a few hundred μm, and other structures have sizes less than 10 μm. The targeted production conditions may also vary widely. The rate of the sheets or strips to be structured may, for example, range from 1 m/min to 20 m/min. The appropriate conditions for a correct filling of the structures may be very different. Generally, it can be imagined that the following parameters should be taken into account for a correct filling:

the rate of the strip
the size of the etching roller,
the quantity of the volumes to be displaced and the fineness of the structures to be filled,
the temperature of the glass
the pressure of the roller on the strip.

The filling of the etching with the glass is determined by the fluid flow mechanism. This flow is dictated by a conservation equation—in this case, the Navier-Stokes equation for an incompressible Newtonian fluid. Apart from a few simple examples such as the flow between two parallel planes, resolving this equation involves numerical methods (CFD). It is therefore possible to consider producing filling simulations for a given structure. Such simulations must therefore test the variable parameters of the method such as the temperature of the glass, the pressure of the roller, the size of the roller, etc. Now, this approach does not make it possible to rapidly judge the impact of these parameters on the design of the printing method as a whole.

We will develop a new approach hereinbelow.

We will look first of all at the mechanism for filling a more or less narrow structure to be filled with glass to form protruding parts, notably edges and peaks. Such structures are more difficult to form in the glass than recessed structures, formed by the impression of the protruding parts of the tool.

Mainly, two mechanisms slow down the filling of such structures: the deformation of the glass and the friction with the walls.

The filling demands a volume deformation of the glass to be adapted to the new geometry. Furthermore, a portion of this glass is in contact with the walls. Depending on the nature of contact which may be more or less slippy, a resistance to flow is established. These two mechanisms oppose the filling of the edge. The rate of the glass during the filling determines the time needed to obtain the targeted filling. This rate varies in time and space. Hereinafter, we will simplify by considering only an average rate when filling a structure. This average filling rate $\bar{v}$ depends on the viscosity μ, the pressure and the geometry of the structure and the friction against the walls. As we will see later, for this type of problem, a simple and generalized equation can be formulated for the rate of deformation:

$$\bar{v} = \frac{\Delta p}{\mu} \cdot CR_{geo} \cdot CR_{fro}$$

The factor $CR_{geo}$ is a shape coefficient which expresses the volume deformation capability of the glass and the factor $CR_{fro}$ expresses the impact of the adhesion or slipping of the glass against the walls of the structure during filling. The pressure $\Delta p$ for the filling is given by the pressure difference in the glass underlying the structure to be filled and the pressure in the glass at the front of the filling. Large pressure gradients result from the start of the contact between the glass and the roller which creates the $\Delta p$ necessary for the filling. Toward the end of filling, the glass has filled the structure and the pressure becomes more uniform.

An increase in the pressure $\Delta p$, and a reduction in the viscosity $\mu$, speeds up the filling. Some structures entrap air during filling. This must be taken into account when estimating the pressure required for the filling. If the pressure of the trapped air causes a problem, an additional pocket or a permeability of the matrix makes it possible to avoid the problem.

A slipping agent such as $SO_2$ on the metallic surface of the tool facilitates filling.

The filling time $t_{filling}$ is given by the characteristic length S of the structure to be filled and the average filling rate:

$$t_{filling} = \frac{S}{\bar{v}}$$

The contact time between the etching roller and the glass is given approximately by the intersection of the surface of the strip with the etching of the roller. It is expressed by the following equation:

$$t_{contact} = L_{contact}/v_{strip}$$

in which $t_{contact}$ is the contact time between the etching roller and the glass, $L_{contact}$ is the length of contact between the roller and the glass and $v_{strip}$ is the rate of advance of the strip.

FIG. 31 represents an etching roller applied to a flat glass. During an etching process, we have two steps, the first being the molding of the structure and the second being the demolding. The length of contact between the roller and the glass is not defined by all of the intersection of the roller and the glass but only by the portion corresponding to the molding.

The length of contact for a flat strip and a structured roller is given approximately by the following formula:

$$L_{contact} = 0.5 \cdot \sqrt{r_{roller}^2 - (r_{roller} - depth_{etching})^2}$$

in which $L_{contact}$ is the length of contact between the roller and the glass, $r_{roller}$ is the radius of the roller and $depth_{etching}$ is the average depth of the etchings.

A good filling of a structure demands:

$$t_{filling} < t_{contact}$$

Obviously, an enlargement of the diameter of the roller prolongs the length and the time of contact between the roller and the glass. However, an excessive enlargement of the roller causes another problem in the method as we will see later.

If the temperature of the strip permits, the contact time could be prolonged by a curvature of the strip around the etching roller as disclosed by the patent FR 2934588. To produce such a curvature, the strip requires a certain deformation capability. The radius of curvature of the strip that can be produced during advance without causing it to break depends on the viscosity and therefore the temperature, its thickness and the rate of displacement of the strip. The workability conditions are known to those skilled in the art from observation of the temperatures and of the radii of curvature of the strips that can be allowed on float glass or rolled glass production lines.

When forming structures, the viscous resistance slows down the filling of the structures as discussed previously. The pressure helps to overcome these resistances. Prolonging the contact time would also help to fill the structures but technological constraints limit the contact time.

We will now look at the formation of the pressure needed for the filling.

The mechanical force between the roller and the glass strip creates a pressure field at the contact interface and in the glass.

The average filling pressure created by the mechanical force between the roller and the glass can be calculated:

$$\bar{p} = \frac{\text{Force}}{\text{Surface area}}$$

This formula includes a contact surface area, corresponding to the width of the etched strip and the length of contact $L_{contact}$. For a periodic and regular structure, the value $L_{contact}$ can be calculated according to the formula given above. For more complex structures, this value may be difficult to define. To overcome this difficulty, hereinafter we will use a linear force FL defined from the total force exerted between the roller and the glass divided by the width of the etched strip. A linear force also offers the advantage of being a quantity that is more explicit to those skilled in the art than a pressure.

A particular problem appears with a counter-pressure generated by the surface tension. We will see later how this counter-pressure depends on the radius of curvature of the surface of the glass and how this counter-pressure can be calculated. This counter-pressure reduces the value of the pressure differential $\Delta p$ for the filling of the structure, in particular the edges. The following example shows the conditions under which this counter-pressure impacts on the filling of a structure:

A linear force of 4000 N/ml is chosen between a strip and a roller. In our example, the length of contact is 15 mm. The average contact surface area pressure is therefore 267 kPa.

The targeted structure has an edge to be produced with a radius of curvature of 10 μm. The calculation of the counter-pressure in the glass under the curvature gives 30 kPa, or approximately 10%. The force chosen for printing the structure is therefore a priori more than sufficient to create an edge with a radius of curvature of 10 μm. However, the counter-pressure of the curvature has a pressure that reduces the value of $\Delta p$ for the filling. To compensate for a drop in the filling rate, the linear force is thus increased by 10%.

The impact of the counter-pressure of the edges increases for small radii of curvature. The impact of the counter-pressure also increases when the printing is done with a low viscosity of the glass because a lower pressure is required.

A particular problem lies in the heat exchange between the glass and the roller before, during and after the contact. As we will see later, it is preferable for this exchange to remain limited because the high temperature demand before printing and the cooling demand after printing are contradictory. An intermediate temperature will preferably be chosen for the roller to limit the thermal disturbance upstream and downstream. To assess the heat exchange risk during the contact of the roller with the glass, it is useful to calculate the typical contact time.

For example, on a structure with a depth of 200 µm and a mid contact height of 100 µm, a roller of diameter 300 mm with a rate of advance of a flat strip of 10 m/min is applied. The length of contact of the molding is 5 mm and the contact time is 0.03 sec. This contact time is too short for a significant heat exchange for standard structures. For the filling of very small structures, a localized exchange could affect the temperature of the glass entering into the etching of the roller. In this case, the temperature of the roller must be close to that of the glass.

Another criterion for the choice of roller surface temperature stems from the problem of sticking between the glass and the roller.

A recent study (G. Rieser, G. Spiess, P. Manns, J of Non-crystalline solids 354 (2008) 1393-1397) has demonstrated that the temperature for the initial sticking of soda-lime glass to different metal or ceramic surfaces occurs between 560 and 600° C., for identical glass and mold temperatures. Between 600 and 640° C., the sticking becomes intense. A chrome coating of the metal surface increases this intense sticking temperature to approximately 670° C. In these tests, a pressure of 2.5 MPa was applied for 5 sec. This contact time is far greater than the contact time of a flat strip advancing under an etching roller with a float process. Our own tests have, moreover, revealed a sticking of the glass to a CrNi steel with no particular surface treatment with a roller temperature of 600° C. and a glass temperature of approximately 820° C. Coating the roller with graphite powder made it possible to push back the glass sticking temperature to much higher values. Treating the molding surfaces, for example with carbon particulates obtained from a partial combustion, or from $SO_2$, is known to those skilled in the art.

Thus, a roller surface temperature of 600° C. is acceptable for printing structures using the proposed method.

In practice, according to the method, the surface temperature of the etching roller is approximately 200° C. less than the glass print temperature.

For certain structures, it is preferable to further increase this temperature to limit a cooling effect of the glass before and during the etching.

One method of checking the risk of sticking of the glass to the roller, in particular according to the temperature of the glass, the surface of the roller, the surface material, the duration and the pressure of the contact between the roller and the glass consists in reproducing tests as described in the publication by G. Rieser et al. cited previously. This makes it possible to determine, for a given structure, the temperatures of the glass and of the roller from which a risk of sticking appears.

It is now necessary to determine the conditions for a good filling of a particular structure, namely the viscosity of the glass and the force exerted by the etching roller.

For a precision structure, it is important to obtain small radii of curvature.

We specify here that the structure of the etching roller should be finer than that to be obtained on the glass in the etching step. Similarly, it may have additional volumes which will not be filled. A good filling makes it possible to obtain the small radii of curvature even if the structure of the roller is not entirely filled.

The method according to our invention generally aims to obtain radii of curvature that are equal to or less than those of a specification. Nevertheless, for certain applications, it is not desirable for the radius of curvature obtained to be less than the specification. Such is the case, for example, for optical concentrators and lenses.

Advantageously, in an equivalent manner, it is possible to determine the conditions for obtaining the radii of curvature of the protuberances and recesses of a particular structure for a given rate of advance and an etching roller diameter. This determination corresponds to an operating point formed by a pairing [glass temperature/linear force exerted by the etching roller]. The "glass temperature" parameter could be replaced with "glass viscosity".

A first method consists in producing a digital modeling of the filling of the imprint using a simulation code that takes account of the behavior of the glass.

An experimental method can be used to directly check the obtaining of the desired radius of curvature by virtue of a good filling of a structure.

The particular feature of the glass is its relatively high surface tension. There is therefore the difficulty of not being able to distinguish between a poor filling during printing or a creep of a fine structure after printing, inducing an excessively high radius of curvature of the protuberances or recesses.

One method, according to the invention, for resolving this problem is to use another material that has a rheology and in particular a viscosity comparable to that of the glass but that has a much lower surface tension. This avoids any degradation of the structure by creep after printing.

The choice of a paste that has a low surface tension, compared to glass, makes it possible to avoid the creep and thus makes it possible to show good filling.

Advantageously, materials used for taking dental imprints meet this requirement. After preparation of the material by mixing the components, the viscosity increases slowly with time. These materials are very well documented in the literature and have known viscosities.

To carry out the experimental study, it is necessary to have a material with a viscosity that varies between $10^5$ and $10^4$ Pa·sec within a time interval compatible with the procedure. This viscosity band corresponds, for soda-lime glass, to temperatures of between 800° C. and 900° C.

"Fusion light body", described in the 2009 thesis by Jurgen Stelzig at GieRen University, for which the viscosity trend is represented in FIG. 16, is in particular chosen.

The viscosity of this material is thus approximately:
 $4·10^4$ Pa·sec after 120 sec, corresponding to a temperature of 850° C.,
 $1·10^4$ Pa·sec after 20 sec, corresponding to a temperature of 900° C.

In this FIG. 16, the points corresponding to the "fusion light body" paste are represented by lozenges; the points corresponding to the "flexitime correct flow" paste are represented by small squares; the points corresponding to a soda-lime glass at 900° C. are represented by triangles, and the points corresponding to a soda-lime glass at 850° C. are represented by large squares.

After the mixing of the "fusion light body" components, a sheet of this material is produced with a thickness corresponding to that of the glass to be produced, for example 3 mm. The width and the length of the sheet will be dependent on the experimental printing device, for example 100×200 mm.

The shaping of the sheet can be done rapidly using a smooth roller that is made to roller on two guides 100 mm apart and with a thickness of 3 mm, somewhat as a confectioner would do to produce a pie pastry.

The smooth roller is then replaced with a structured test roller 20 (FIG. 17) with the desired geometry, the diameter of which is that of the roller planned for the installation, for example 300 mm in diameter, and with a weight of 30 kg. This roller will exert on the sheet of paste a force of 3000 N per linear meter which is representative of an industrially producible pressure.

With the same etching roller, it is possible, for example, to increase the pressure exerted by the roller on the paste by adding additional weights to the roller axis.

FIG. 17 diagrammatically represents the test rig.

The etching roller 20 is rolled out onto the sheet of paste 21, placed on a support 22, at the rate of production of the glass after a time since the preparation of the paste corresponding to the targeted paste viscosity.

Care will be taken to avoid having the paste stick to the etching roller and to ensure that the paste slips on the surface of the roller. For this, a slipping agent is, for example, used on the surface of the paste or of the roller. This slipping agent may be a thin layer of soapy water or oil.

This procedure is reproduced on other sheets of paste for different times representative of different viscosities and, for each of these viscosities, different forces exerted by the roller. For example, these tests are carried out for 3 different viscosities and 3 different forces.

After the sheets of paste have completely hardened, the imprints obtained are analyzed and the average thickness of the sheet is checked using optical or mechanical means.

These analyses can be used to plot a diagram C1 (FIG. 18) representing the radius of curvature of the critical protruding region, difficult to obtain, as a function of the linear force exerted on the sheet for different strip surface temperatures, and therefore different viscosities, tested. For example, 3 temperature levels were tested, and the diagram has 3 curves, each curve corresponding to a given temperature T1, T2, T3. An exemplary diagram is represented in FIG. 18.

The x axis of this diagram represents the force per linear meter F1, F2, F3 exerted by the roller.

On the y axis, the radius of curvature of the critical protruding region of the structure is expressed as a function of the desired final radius of curvature R2 (after creep of the glass and fixing), which is generally set in a specification. The y axis is graduated in (R2−x % R2), x % being able to be equal to 10%, 20%, etc., depending on the cases. In practice, the radius of curvature R1 before creep must be less than the desired final radius R2, because a relative increase in the radius R1 occurs by creep of the glass before fixing.

As a variant, another imprint quality criterion could serve as the y axis, in particular the filling level of the imprint which would be expressed between 0 and 100%, 100% corresponding to a perfect filling of the imprint.

From the curves of the diagram C1 (FIG. 18), a new diagram C2 (FIG. 19) is plotted using points of the diagram C1 corresponding to a radius of curvature value R1 equal to (R2−x % R2), for different values of x %.

It should be noted that it is also possible to express the relationship between R1 and R2 in the following forms:

x %=(R2−R1)/R2
R1=R2(1−x %)
R2=R1(1−x %)

Furthermore, in the interests of simplicity, in some figures we have designated the radius R1 as "R2−x %".

The diagram C2 is established with, on the x axis, the temperature of the surface of the strip to be etched and, on the y axis, the linear force in N/m exerted by the roller. In FIG. 19, a solid line limit curve G corresponds to a radius of curvature R1 before creep equal to R2−10%, R2; a lower, dashed-line curve corresponds to a radius of curvature R1=R2, in other words without creep; and a higher dashed-line curve corresponds to a radius of curvature R1 before creep equal to R2−20% R2.

The various curves of FIG. 19 correspond to operating points (linear force/temperature pairings) that can be used to obtain a determined radius of curvature value R1.

If it is estimated that the increase in the radius of curvature by creep, after printing, and until fixing, is 10% as a relative value of the radius, points of the limit curve G (R2−10% R2) represent the pairings that make it possible to obtain the desired final radius of curvature R2.

The curve G obtained in this diagram C2 delimits two domains. The first domain A1, situated above the curve G, comprises the pairings (linear force/temperature) that make it possible to obtain a radius of curvature R1 of the imprint before creep less than or equal to R2−10% R2, and make it possible to obtain after creep a radius of curvature equal to or less than R2. The second domain A2 situated below the curve G comprises the pairings (linear force/temperature) that do not make it possible to obtain, after creep, a radius of curvature equal to or less than R2.

To avoid crushing the sheet and reducing its thickness with an excessive force, the pairing (linear force/temperature) retained will be chosen, in the right domain A1, close to the limit curve G. In certain cases, the pairing (linear force/temperature) will be chosen on the limit curve G to obtain exactly the radius R2 of the specification.

If, in the diagram C1, it is observed that the 3 curves obtained with the sheets of paste are limited partly below a radius of curvature value equal or too close to the desired final value R2, this means that it will not be possible to correctly obtain the radius of curvature of the edges of the imprint. In practice, the limitation of the curves indicates that the pressure exerted by the roller leads to a reduction in the thickness of the sheet. This reduction in the thickness will be checked on the samples concerned.

To successfully obtain the desired filling level, it is necessary to maintain the thickness of the sheet situated below the layer to be structured at a higher viscosity, and therefore a lower temperature, so as to retain a sufficient rigidity to limit crushing.

The thickness variation of the sheet during etching can be expressed by the following formula:

$$\Delta e = \frac{F_\perp}{L} \cdot \frac{1}{vit \cdot \mu}$$

In this formula, $\Delta e$ represents the relative reduction in thickness of the sheet, $F_\perp$ represents the force exerted by the roller on the sheet over the width L, vit represents the relative rate of displacement between the roller and the sheet and $\mu$ represents the viscosity of the sheet.

This formula makes it possible to determine the viscosity, or temperature, level necessary to be able to create a greater resistance making it possible to limit the reduction in the thickness of the sheet to a given value. This additional resistance makes it possible to obtain a better filling of the imprint.

A new series of tests is carried out with a sheet of paste whose thickness is limited to a little more than the average thickness of the targeted structure.

This new series of tests makes it possible to plot new diagrams C1 and C2 and define pairings (linear force/temperature) that make it possible to correctly obtain the radii of curvature of the structure because of the absence of pressure loss through crushing of the thickness of the paste.

To implement this increase in the resistance to crushing on a strip of glass, the thermal conditioning must create a thermal gradient between the hotter layer to be printed and the colder volume of the strip.

Pairings (linear force/temperature) for the layer to be structured have thus been determined, associated with the maximum temperatures, or minimum viscosities, in the rest of the thickness of the sheet.

This procedure according to the invention is simple and can easily be implemented to find the appropriate parameters.

From these curves, a pairing (linear force/temperature) is determined that makes it possible to produce the structure with the targeted radius of curvature quality with no notable reduction in the thickness. The pairing will be optimized in conjunction with the other parameters taken into account in the flow diagram of FIG. 1 described hereinbelow.

Fixing Step

Smoothing an Etched Structure on a Glass Strip

The surface energy of a structure is greater than that of a flat surface. The surface tension creates the force that tends to shorten the surface lengths and thus flatten the surface. This smoothing of the surface entails displacing the volumes of the "heights" to the recesses to fill the recesses. The diagram of FIG. 21 illustrates this process for a groove-type triangular geometry represented by solid lines. In this figure, the arrows represent the displacement of the glass, during smoothing, to return to the flattened surface represented by a dotted line. The surface tension generates a "flow" with maximum rates on the surface. As for the glass in the volume, this remains more or less immobile.

It is possible to imagine many factors that determine the smoothing of a structure:
    the shape of the structure
    the size of the structure
    the viscosity (temperature) of the glass
    the surface tension
    "viscoelastic" stresses following the "forming" of the structure This type of problem can therefore be qualitatively understood. However, it is difficult to determine all the parameters that influence the smoothing and to quantify the impact of these parameters.

The situation is further complicated if these parameters vary in space or time, in particular when the structure is being fixed during cooling.

The smoothing of the surface structures in different materials is a topic that has been covered in a few scientific publications, but which are not linked to a method for etching a strip of glass by continuous printing.

For the smoothing of a sinusoidal surface, there is an analytical solution published by Mullins in 1959 (W. W. Mullins, Journal of Applied Physics 30, p 77-83, 1959). This solution is valid for a constant surface tension and a constant viscosity.

Other types of surfaces have also been covered in the literature:
    V-shaped grooves (Cassidy and Gjostein, Journal of the American Ceramic Society 53, p 161-168, 1970)
    Submicrometric structures in 1 and 2 dimensions (Wang et al., Journal of Applied Physics 101, 023530 (2007))

These solutions are valid for a temperature, and therefore a viscosity, that is constant and uniform in the volume, for the structures being studied. They are not applicable for estimating the degree of creep of a structure of any geometry and when the temperature varies.

It emerges from the literature that the determining forces for the smoothing of the glass are:
    the surface tension as motive force
    the viscous flow as braking force The surface energy or the surface tension $\gamma$ of the soda-lime glass is virtually independent of temperature. However, the viscosity $\mu$ of the glass varies strongly with temperature which makes it possible to stop the smoothing by cooling.

According to the invention, a quantitative link has been created between the creep of the structures and the parameters for producing a structure to be etched on a strip of glass continuously. We will now explain the mechanisms that lead to this link.

The surface tension tends to reduce the extent of the surface to minimize its energy. Surface tension and surface energy are equivalent.

Drawing the glass to a thin strip requires a certain energy to create the new surface of the two sides of the strip. Once this strip is created, it requires a minimum force to be maintained to retain the new surface. In the forming methods based on drawing or rolling, this force is provided by the mechanical transport of the strip. The cooling then increases the viscosity of the glass. The glass in the thickness therefore opposes a contraction by the tension of the two surfaces of the strip.

As illustrated in FIG. 22, in a sheet of glass, this surface tension in the plane of the sheet of glass, represented by dotted arrows, induces a compression in the thickness of the glass represented by a solid line. This compression is generally weak compared to the other tensions present in a sheet of glass.

A structuring of the surface consists, for example, of a protuberance of said surface as illustrated in the diagram of FIG. 23.

Such a curved surface in a flat sheet of glass develops additional tensions and compressions at the level of the protuberance, as represented by solid line arrows. The volume of glass under the protuberance is therefore exposed to a field of tensions and compressions that are triaxial, anisotropic and heterogeneous.

This field of tensions and compressions tends to displace the glass in the protuberance to minimize the energy of the surface.

For a glass that is still in a viscous state, the anisotropic compression causes a deformation. The deformation is all the faster when the anisotropic compression is high. A deformation by viscous flow is described by the laws of fluid mechanics. In fluid mechanics, the expression "pressure gradients" is used rather than "anisotropic stresses". If the pressure gradients have disappeared following the flow, the motive force is eliminated and the flow stops.

For a fluid with a surface tension, the ideal form without internal pressure gradients is a sphere (without external forces). In the case of a strip of glass, the sheet of glass with flat surface is considered as an "ideal" case although there remains a weak biaxial compression in the volume. We will assume hereinafter that the pressure in this sheet with flat surface has a pressure benchmark $p_{ref}=0$. Any ripple of this surface causes an increase in the pressure in the glass underlying this curved surface. The pressure difference between the benchmark $p_{ref}=0$ and the rippled surface creates pressure gradients which generate the flow of the glass and therefore the smoothing.

To quantify the smoothing, it is therefore necessary to quantify the pressure gradients for a particular structure. Knowing the field of tensions/pressure gradients then makes it possible to assess the deformation overall. However, the interest is focused on conserving the precision structures. It is therefore desirable to "control" the deformation of the edges and peaks, namely the modification of their radii of curvature.

A curved surface with a surface tension induces compressions or tensions in the underlying glass depending on whether the curvature is positive or negative, as represented in FIG. 23.

The pressure p inside the glass may therefore be greater than or less than the pressure benchmark corresponding to a flat surface. For the linear protuberance of FIG. 23, local regions are found with a positive or negative pressure.

The pressure $p_c$ in a stationary fluid with a curved surface is given by the Young-Laplace equation, with H being the average curvature and γ being the surface tension:

$$p_c = \gamma \cdot 2 \cdot H$$

The average curvature H is defined by the following relation, in which $R_x$ and $R_y$ represent the main radii of curvature:

$$H = \frac{1}{2} \cdot \left( \frac{1}{R_x} + \frac{1}{R_y} \right)$$

For a surface with an average curvature H, regardless of its shape, it is possible to formulate a radius $R_{eff}$ defined by the following relation:

$$R_{eff} = \frac{1}{2H}$$

Herein, we will consider a single radius R equal to $R_x$, $R_y$ being assumed to be infinite, which corresponds to the case of a straight edge. To process shapes other than edges, it is sufficient to take account of the radius $R_{eff}$.

In the case of a straight edge with a radius of curvature R, the local pressure p is given by the relation:

$$p_c = \gamma \cdot \left( \frac{1}{R} \right)$$

The pressure that appears in a straight edge with constant radius of curvature is therefore inversely proportional to this radius. The smaller the radius, the higher the pressure. The diagram of FIG. 24 shows the trend of the pressure as a function of the radius of curvature of an edge for soda-lime glass with a typical surface tension of 0.3 N/m.

For this surface tension of 0.3 N/m, the local pressure of an edge of radius R=1 mm is approximately 300 Pa, that of an edge of radius R=0.1 mm is approximately 3 kPa and that of an edge of radius R=10 μm is approximately 30 kPa. When approaching the nm (nanometer) range, the pressures exceed one atmosphere. It is easy to imagine a deformation of the glass that is still viscous with such pressures.

To quantify the smoothing effect of the glass after structuring, the flow of the glass generated by the local pressure in a given structure was studied.

In the "standard" industrial glass forming conditions, the glass behaves like a Newtonian fluid with a viscosity that is solely a function of its composition and the temperature. The variation of the viscosity μ with the temperature T of a given glass is generally described by the VFT law expressed by the following relation:

$$\mu(T) = 10^{-A + \frac{B}{T-T0}}$$

The parameters A, B and $T_0$ depend on the composition and the type of glass. They are known in the art.

The forming of the glass is generally done between the plasticizing temperature, also called Littleton temperature, and the working temperature. These values correspond to temperatures between approximately 720° C. and 1000° C. for a soda-lime glass.

The flow of the glass is determined by a conservation equation—in this case the Navier-Stokes equation for a non-compressible Newtonian fluid.

With no volume force and at low rates, the convective term and the volume force term can be disregarded. In the case of a stationary flow, in which the transitional term can be disregarded, the following relation is obtained:

$$\nabla p = \mu \nabla^2 v$$

In this equation, $\nabla p$ represents the pressure gradient and $\mu \nabla^2 v$ represents the viscous friction term, with v, the rate vector.

This differential equation determines the flow for each position in the fluid in three dimensions and for arbitrary geometries. Resolving this equation usually entails numerical methods (CFD).

In certain geometries and situations, there are analytical solutions for this equation. For example, for a stationary flow in a tube or a stationary flow between two sheets.

In these precise solutions, the following proportionality is always found between the rate of flow, the pressure difference Δp and the viscosity μ.

$$v \propto \frac{\Delta p}{\mu}$$

This proportionality is valid for any non-compressible, laminar, stationary and Newtonian flow.

This proportionality can be generalized with geometrical factors according to the given flow problem:

$$\bar{v} = \frac{\Delta p}{\mu} \cdot C_{geo}$$

In this formula, $C_{geo}$ is a shape coefficient which expresses the facility with which the glass can be deformed during creep. This coefficient is characteristic of an element of the surface structure exposed to the creep. It has the dimension of a length.

In this equation, $\bar{v}$ represents the average rate of displacement of the glass and Δp represents the pressure difference at the limit conditions of the structure element concerned. This simplification is appropriate in particular for the problems of flow with headloss in ducts with a simple geometry and remains valid for flows for which the geometry and the limiting conditions are not too complex. Obviously, for a non-stationary problem, this solution is no longer valid because it would be necessary to reintegrate the transitional term of the Navier-Stokes equation. However, for a "slow" transitional trend of the geometry, it is possible to approximate by:

$$v(t) = \frac{\Delta p(t)}{\mu} \cdot C_{geo}(t)$$

Such a solution notably remains valid if only a reduced time period is considered with a very limited variation of the parameters, which is the case in our application in which the aim is a low creep with a limited variation of geometry.
Local Pressure and Flow Combination It is now possible to try to establish a link between the rate of flow of the glass corresponding to the creep and the local pressure generated by a curvature of the surface.

FIGS. 25, 26, 27 illustrate the local deformation mechanism of an edge with increase in the radius of curvature.

The mechanism for deformation of an edge is first considered in "steps". The curvature of the surface of the glass first induces a local pressure directly under the surface. This pressure is propagated inside the glass (mandatorily, to avoid infinite gradients) as represented by isobars in FIG. 25.

The pressure gradient then induces a flow of the glass from the curved surface toward the interior, as represented by rate vectors in FIG. 26. This flow displaces the position of the curved surface. This displacement of the surface enlarges the radius of curvature and reduces the local pressure. The motion slows down and the rate field becomes a function of time.

By definition, it is possible to associate the rate of displacement of an edge $v_s$ from the surface to the center of an edge at the rate v in the preceding equation. Moreover, the pressure $\Delta p$ is associated with $p_c - p_{ref}$. Regarding the radius of curvature, the central portion will be taken into account without the transitional regions toward the neighboring planes.

The combination of the relations for the pressure $p_c$ and the viscous flow gives the following equation:

$$v_s(t) = \frac{\gamma}{\mu} \cdot \frac{C_{geo}(t)}{R(t)}$$

The rate of flow or of displacement of the surface of an edge indicates its degree of deformation by creep.

A deformation of the surface by retraction of an edge with a rate $v_s(t)$ during a time period $\Delta t$ leads to a displacement of said surface by a length $\Delta L$ $$\Delta L = \int_0^{\Delta t} v_s(t) \, dt$$

It is assumed that the deformation of the planes that form the edge is negligible compared to the deformation of the edge, which is valid for the initial state of deformation of precision structures.

FIG. 28 represents the variation of the radius of curvature as a function of the displacement of the surface over a length $\Delta L$, R1 being the initial radius and R2 the radius after creep. In this particular case, the planes adjacent to the edge do not change position. The surplus mass of glass produced by the enlargement of the radius of curvature is dispelled toward the volume below the edge. The conditions at the limits between the edge and the rest of the structure determine the creep mode. For the particular case represented in FIG. 28, it is possible to establish a simple relationship between the displacement of the surface of the edge $\Delta L$ and the enlargement of the radius of curvature. The new radius R2, after creep, becomes:

$$R2 = R1 + \frac{\Delta L}{\sqrt{2} - 1}$$

Generally, the relationship between the enlargement of the radius and the retraction of the surface can be formulated as follows:

$$R2 = R1 + \Delta L \cdot F_{RL}$$

In this formula, the factor $F_{RL}$ establishes the relationship between the displacement of the surface and the enlargement of the radius.

As we have already seen, the displacement of the surface can be determined from the rate of creep, which makes it possible to formulate:

$$R2 = R1 + F_{RL} \cdot \int_0^{\Delta t} v_s(t) \, dt$$

And with:

$$v_s(t) = \frac{\gamma}{\mu} \cdot \frac{C_{geo}(t)}{R(t)}$$

the following is obtained:

$$R2 = R1 + F_{RL} \cdot \int_0^{\Delta t} \frac{\gamma}{\mu(t)} \cdot \frac{C_{geo}(t)}{R(t)} \cdot dt$$

In this formula, $\Delta t$ indicates a time period for the creep which is not a priori limited. The creep could therefore continue until the edge has been totally flattened with an infinite radius of curvature R(t). It is therefore necessary to impose a technical stop on the creep by cooling. Such a cooling should considerably increase the viscosity which becomes a function of time $\mu(t)$ as anticipated in the preceding formula. However, we do not automatically know the rate of cooling and the final viscosity to be expected to stop the creep.

However, we aim for an increase in the radius R(t) that is limited, for example, to 20%, and therefore a limitation of the creep. The variation of the geometrical factor for the flow of the glass during the creep will consequently remain low. The necessary increase in the viscosity to fix the structure is dominant relative to the variation of R(t) and of $C_{geo}(t)$. Given this condition, the variation of R and of $C_{geo}$ can be disregarded, which means that they can be taken out of the integral:

$$R2 = R1 + F_{RL} \cdot \frac{C_{geo}}{R} \cdot \gamma \cdot \int_0^{\Delta t} \frac{1}{\mu(t)} \cdot dt \qquad \text{Equation (1)}$$

The only variable remaining in the integral is thus the viscosity. We will hereinafter call this integral "fixing integral".

The link between the enlargement of the radius and the creep is therefore given by three factors that are determined by the size (R), the shape ($C_{geo}$) and limiting conditions ($F_{RL}$)

for the creep of a particular edge. It is appropriate hereinafter to group together these three factors in a single representative coefficient ($C_{tot}$) for the creep of a particular structure:

$$C_{tot} = F_{RL} \cdot \frac{C_{geo}}{R}$$

To be able to determine the degree of creep as a function of the various parameters, it is necessary to quantify the coefficient $C_{tot}$ and the fixing integral.

As we will see later, the fixing integral broadly determines the degree of creep of the structures. It is, however, necessary to study the impact of the coefficient $C_{tot}$ and to find methods for determining its value for a particular structure.

Method for Determining $C_{tot}$

Initially, we deal with the determination of $C_{tot}$ by means of the symbolic solution for the fixing integral, which will be described later in this document.

Figure 2:
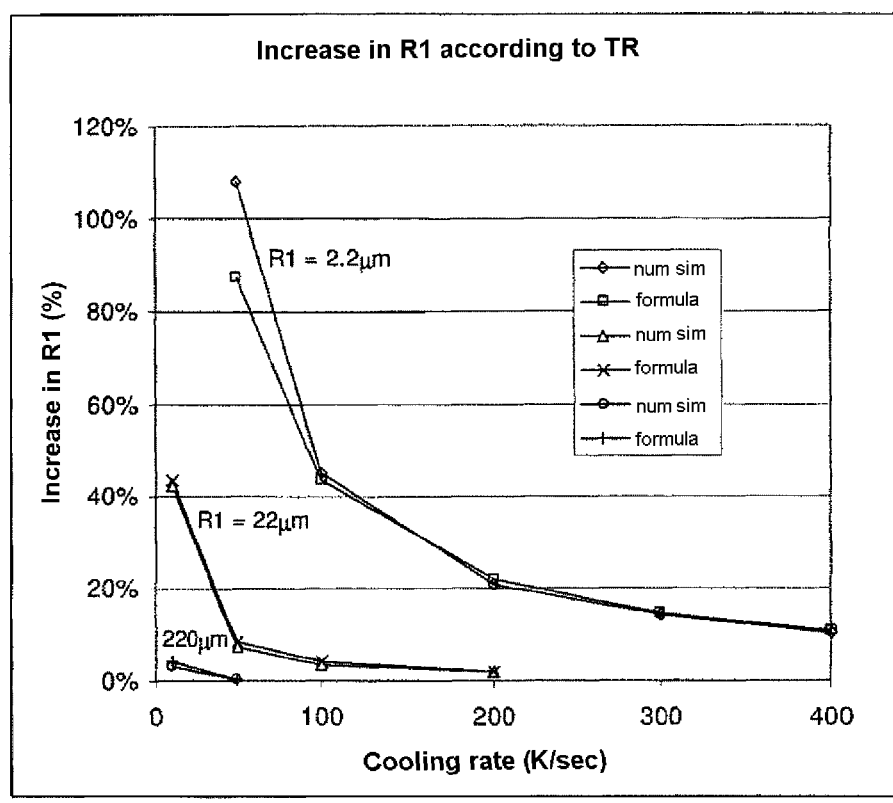
FIG. 2 is a diagram showing the degradation of a structure with, on the x axis, the cooling rate and, on the y axis, the percentage increase in the radius of curvature, for an initial print temperature of 850° C.

The curves of FIG. 2 show examples of enlargement for three initial radii of curvature as a function of the cooling rate, for a soda-lime glass at an initial temperature of 850° C. and sinusoidal groove-shaped structures. In this diagram, the increase in the radius of curvature on the y axis is plotted as a function of the cooling rate on the x axis. The drastic increase in creep is observed for low radii of curvature—which demands very high cooling rates to retain these structures. The curves also show a comparison of the numerical and symbolic simulations for these sinusoidal grooves. A good agreement is observed between the numerical and symbolic results.

From these comparative tests of the numerical calculations and the symbolic calculations on sinusoidal grooves, a proportionality was recorded between the radius of curvature and the geometrical factor $C_{geo}$. This proportionality is observed over several orders of magnitude of the radii of curvature of the peaks and recesses of the sinusoid. This made it possible to determine a single constant value for an overall coefficient $C_{tot}$. The value of the coefficient $C_{tot}$ used in the symbolic calculations is 0.4. This value makes it possible to calculate the creep with the symbolic solution over several orders of magnitude of dimension of said structure as long as the creep remains below 50%.

It is possible to obtain the coefficient $C_{tot}$ from numerical simulations of the creep of a particular structure. It is also possible to determine this coefficient by a simple experimental method.

A direct observation of the creep of a structured glass at the print temperature and during cooling is very difficult to do because of the high temperatures and the intense infrared radiation.

One solution lies in the use of a material with a comparable creep behavior at low temperature; an observation and measurement of the creep would be easy to do.

Now, apart from mercury, no fluid has a surface tension as high as glass. At this point, it should be understood that a totally equivalent creep can be obtained with a material with a much lower surface tension provided that this material is a Newtonian fluid with a viscosity that is known and suitable to allow for an observable creep. For a constant temperature, and therefore a constant viscosity, and a limited creep, the radius R2 is given by a simplified form of the creep formula $$R2 = R1 + C_{tot} \cdot \frac{\gamma}{\mu} \cdot \Delta t$$

Thus, a measurement of the creep during a time period $\Delta t$ on a material with a known ratio $\gamma/\mu$ would make it possible to determine the coefficient $C_{tot}$ of a particular structure.

Athabasca bitumen is a well documented material which has an appropriate surface tension/viscosity pairing. Its viscosity varies for example between 3000 Pa·s at 9° C. and 3 Pa·s at 60° C. (http://www.heavyoilinfo.com/blog-posts/bitumen-viscosity-vs-temperature). Its surface tension is slightly dependent on the temperature and is 35 mN/m at 25° C. (Mehrotra et al. The Canadian Journal of Chemical Engineering vol 63, April 1985, p 340-343).

Observing the enlargement of the radius of curvature of an edge, for example by a microscopic video camera, at an angle brushing the surface of the structure makes it possible to measure, for a time period t, a difference between R1 and R2. With the value of $\gamma/\mu$, the value of $C_{tot}$ is then determined for the particular structure.

FIG. 32 is a schematic representation of a creep measurement at low temperature. The device comprises a stamp on which is etched the targeted structure, samples of Athabasca bitumen, a device for measuring the temperature of the sample, a device for heating and cooling the sample and a microscopic camera. The first step consists in ensuring a good filling of the stamp imprint with the sample so that the radius of curvature R1 obtained after printing is slightly less than the targeted radius of curvature R2 to ensure a geometry close to the situation of creep of the structure of the glass. For this, the sample is printed at a temperature slightly below the temperature at which the creep is to be measured. This first step enabled us to obtain the radius R1 before creep. Then, the temperature of the sample is slightly increased and kept constant for a time period that makes it possible to easily observe the creep, for example 10 sec. The temperature of the sample is then rapidly lowered to fix the state of the surface at the end of the creep. A fixing of the structure is not mandatory in this experiment but makes it possible to check the in-situ observation of the creep.

A preliminary estimation of the creep with a coefficient $C_{tot}$ of, for example, 0.5 makes it possible to determine upstream an appropriate viscosity/temperature for the degree of creep between R1 and R2 and the targeted time period.

After observation of the results of the test, the value $C_{tot}$ of this structure is calculated. If the parameters chosen for this first test did not make it possible to observe the desired creep, a second test is carried out with an adaptation of the temperature and/or of the creep time.

Symbolic Solution of the Fixing Integral

In the fixing integral, the viscosity becomes a function of time during cooling. With the conventional definition of the VFT equation, it is therefore possible to formulate:

$$\mu(t) = 10^{-A + \frac{B}{T(t) - T0}}$$

T(t) gives the temperature of the glass during cooling.

The fixing integral therefore becomes:

$$\int_0^{\Delta t} \frac{1}{\mu(t)} dt \Rightarrow \int_0^{\Delta t} \frac{1}{10^{-A+\frac{B}{T(t)-T0}}} dt$$

Depending on the cooling means implemented, the cooling profile of the surface of the glass may follow very many variants. To make the solution of the integral accessible, the initial phase of the cooling is approached with a linear trend with an average cooling rate.

$$T(t)=T_{imp}+TR \cdot t$$

In this equation, $T_{imp}$ represents the print temperature which is equivalent to the cooling start temperature, TR the cooling rate and t the time.

After some simplifications, the following fixing integral is obtained:

$$\int_0^{\Delta t} \frac{1}{\mu(t)} dt \Rightarrow 10^A \cdot \int_0^{\Delta t} 10^{\frac{-B}{T_{imp}+t \cdot TR-T0}} dt$$

The solution of the fixing integral constitutes the key element with which to judge the degree of deformation of an edge, determine the fixing time and temperature and quantify the influence of the print temperature and of the cooling rate.

Now, for this type of integral, there is no exact solution.

The "numerical" calculation of the integral obviously remains, which includes two major drawbacks:
- It does not make it possible to determine in one go the correct parameters, which means having to perform a series of optimization calculations
- It is not immediately within the scope of those skilled in the art.

A solution for this integral is therefore sought that is "manipulable". A "conventional" method is to replace the function to be integrated with a series development. Now, to correctly represent a wide range of parameters ($T_{imp}$, TR) it is necessary to develop a large number of terms, more than 6. This makes the solution extremely uncomfortable to manipulate.

A solution to the problem was found by replacing the exponential term with a function with comparable appearance, but easy to integrate.

$$10^{\frac{-B}{T_{imp}+t \cdot TR-T0}} \Rightarrow 10^{\frac{-B}{T_{imp}-T0}} \cdot \left(1 - \tanh\left(\frac{-t \cdot TR}{F_{vis}}\right)\right)$$

In this formula, the factor $F_{vis}$ is a constant suited to a representative viscosity for a given glass. For soda-lime glass, the factor $F_{vis}$ is equal to 46 kelvin. The value of this factor would be different for a glass that has another variation of viscosity as a function of temperature. This new function approaches the exponential function in the technically interesting range of values, that is to say between 750 and 950° C. for soda-lime glass, and for cooling rates TR of 10 to 300° C./s.

The value of 46 K is valid for all types of glass that have a comparable trend of viscosity as a function of temperature, which is the case with most soda-lime and borosilicate glasses, produced by the float or rolling method. For glasses with a very different viscosity slope such as quartz, an adjustment of the factor $F_{vis}$ might be necessary. The new value of this factor can simply be determined by plotting the real viscosity variation curve of the glass concerned and by searching for the factor that makes it possible to match the curve of the approximate function with this real curve.

This function has an exact solution for a determined integral between t=0 and $\Delta t$. This exact solution will be described later. For the case where the temperature is lowered sufficiently and any creep phenomenon is stopped, certain terms in the exact solution may be disregarded. Based on these new elements, we have found a very simple solution for the symbolic calculation of the increase in the radius between R1 and R2.

$$R2 = R1 + C_{tot} \cdot \frac{\gamma}{\mu(T_{imp})} \cdot \frac{F_{vis}}{TR} \cdot \ln(2) \qquad \text{Equation (2)}$$

It is therefore sufficient to calculate the new radius R2, to use the viscosity $\mu(T_{imp})$ at the print temperature, the cooling rate TR in K/s and the coefficient $C_{tot}$ of the structure determined previously. The factor $F_{vis}$ of the viscosity approximation function is found with the kelvin unit.

This formula links the initial radius of the edge, the final radius as demanded by the specification, the print temperature and the cooling rate.

It thus makes it possible, for different types of glass that have comparable viscosity slopes, to define the cooling rate to be applied as a function of the initial radius of the edge, of the final radius and of the print temperature.

It also makes it possible to define the print temperature as a function of the cooling rate to observe the targeted final radius. This temperature will obviously be chosen according to structure forming criteria, notably the force to be exerted.

However, this very simple formula still does not make it possible to determine the time and, respectively, the temperature in order to expect the fixing of the structure. To determine these values, it is necessary to retain all the terms of the solution of the equation (1), in particular those with the time t as a variable.

$$R(t) = R1 + C_{tot} \cdot \frac{\gamma}{\mu(T_{imp})} \cdot \frac{F_{vis}}{TR} \cdot \left[\ln\left(e^{\frac{t \cdot TR \cdot 2}{F_{vis}}} + 1\right) - \ln(2)\right]$$

This equation makes it possible to calculate the radius R as a function of time for a given cooling rate and print temperature. The value of R increases rapidly in the initial phase to stabilize with the cooling on a constant value corresponding to the value R2. This transition to stabilization indicates the time and the temperature for the fixing of the structure as a function of TR and of $T_{imp}$. This makes it possible to determine the time for the cooling directly after printing. Once the structure is fixed, the cooling can continue at a moderate rate.

These data make it possible in particular to define the length of the reinforced cooling section situated just downstream of the etching roller.

The curves of FIG. 2 show an exemplary enlargement of the initial radius of curvature as a function of the cooling rate, for a soda-lime glass at an initial temperature of 850° C.

It can be seen on these curves that a high cooling rate is necessary to conserve small structures. It will also be noted that the conservation of a structure with a radius of curvature greater than 200 μm requires only a cooling rate of approximately 10 K/sec which corresponds to the values typically obtained on strips at the output of the casting units.

A good agreement between the numerical results and the symbolic calculations is also observed with the equation (2). It should be recalled that a single constant value of 0.4 for the coefficient $C_{tot}$ is used in the symbolic calculation. The very simple symbolic solution therefore makes it possible to correctly calculate the degree of increase in the radius of curvature between a value R1 and the final curvature R2.

Fixing Parameters and Link with the Printing Step

The rate of smoothing of a structure is directly linked to its size and its morphology. The smoothing is generated by the local pressure resulting from the radii of curvature of the structure, in particular the thinnest parts of the structure. The smoothing is slowed down by its resistance to a volume deformation.

The smoothing potential of a structure with a given fineness is linked to two main factors, the surface tension γ and the viscosity μ of the glass, bearing in mind that the latter is strongly dependent on temperature.

Beyond an intuitive understanding of parameters that influence the smoothing of a structure as explained at the start, we have been able to identify the parameters that determine the creep. In addition, a simple symbolic formula has been developed to link these parameters and quantify the degree of creep. The parameters to be taken into account are thus:

The surface tension of the glass,
The viscosity of the glass and its trend with temperature,
The temperature at which the etching was done,
The rate of cooling of the glass,
The most constraining structural radius of curvature.

From the equation (2), we can now determine the radius R1 needed to achieve the targeted value R2. We can also determine the rate of cooling TR which leads to a targeted degree of creep x % between R1 and R2. As a reminder, the degree of creep is defined as follows, x %=(R2−R1)/R2.

The following formula, which is a reformulation of the equation (2), makes it possible to calculate, for a given structure, this rate of cooling TR as a function of the print temperature for a degree of creep x % between R1 and R2.

$$TR = C_{tot} \cdot \frac{\gamma}{\mu(T_{imp})} \cdot \frac{F_{vis}}{R2 \cdot x\%} \cdot \ln(2)$$

FIG. 20 is a diagram called C3, formed by a family of curves giving the cooling rate, on the y axis, as a function of the temperature, on the x axis. This diagram corresponds to the fixing step of the method that is the subject of the invention. The 3 curves represented illustrate 3 degrees of increase in the radius of curvature by creep until a fixing resulting in one and the same radius R2.

If, for example, it is estimated that the increase in the radius of curvature R1 by creep, after printing, and until fixing, is 10% as a relative value of the radius R2, the points of the limit curve $G_{flux}$ show pairings (TR/$T_{imp}$) of cooling rate TR and print temperature $T_{imp}$ values that make it possible to achieve the targeted value R2.

The curve $G_{flux}$ obtained in this diagram C3 delimits two domains. The first domain B1, situated above the curve $G_{flux}$, comprises the pairings (TR/$T_{imp}$) that make it possible to obtain a low creep and a radius of curvature less than the maximum radius of curvature R2 in the specification.

The second domain B2 situated below the curve $G_{flux}$ comprises the pairings (TR/$T_{imp}$) that lead to a degree of creep greater than the targeted value and therefore with a radius of curvature greater than the maximum radius R2 of the specification. In some cases, the pairing (TR/$T_{imp}$) will be chosen on the limit curve $G_{flux}$ to obtain exactly the radius R2 of the specification.

From these curves, a pairing (TR/$T_{imp}$) is determined that makes it possible to produce the structure with the targeted radii of curvature quality. The pairing will be optimized in conjunction with the other parameters taken into account in the flow diagram of FIG. 1 described hereinbelow.

The print temperature will in particular be determined by the combination of the filling diagram C2 and fixing diagram C3. A limited degree of creep, for example 10%, is first chosen. Then, a printing force FL that is technically easy to produce is chosen. Using the curve $G_{imp}$ of the diagram C2, the corresponding print temperature is found. For this same print temperature, the cooling rate TR to be produced is determined with the curve $G_{flux}$, in the diagram C3. If this cooling rate is difficult to produce, a lower print temperature and therefore a lower TR value is chosen. The diagram C2 then makes it possible to determine, for the new print temperature, a new printing force FL that will be higher. If this printing force can be produced technically, then a set FL, TR and $T_{imp}$ has been found that makes it possible to obtain the targeted radius of curvature R2.

Cooling Rate

One of the crucial fixing parameters is the cooling rate, notably that of the weight of the glass of the structure from the print temperature. The cooling rate is determined by the heat flux dissipated from this mass of glass. The quantity of heat to be dissipated for a required TR value is given by:

$$q_{tot} = \frac{mass}{surface\ area} \cdot cp \cdot TR$$

In this formula, cp represents the specific heat of the glass, and $q_{tot}$ represents a heat flux per unit of surface area of the glass strip.

The quantity of heat to be dissipated is therefore proportional to the weight of the glass in the print layer which is transformed in structure, the cp value and the required cooling rate. This approach obviously includes a simplification which disregards the variation of cp with temperature, the thermal gradients present within the structure during cooling, etc. However, these variations are negligible compared to the variations of the cooling rates to conserve the various radii of curvature (see FIG. 2).

The heat flux $q_{tot}$ consists of the flux dissipated by the surface cooling and the flux by diffusion in the volume of the glass as a function of its temperature.

$$q_{tot} = q_{surface}|_{x=0} + q_{volume}|_{x=dim\ p}$$

In this formula, $q_{surface}$ represents the density of the heat flux dissipated by the printed face, $q_{volume}$ represents the density of the heat flux roughly at the depth position $d_{imp}$ and which is dissipated toward the interior of the strip.

The cooling rate of the etched layer is thus, generally, a function of the aggregate of these two fluxes.

The means to be implemented to obtain the necessary cooling rate can be determined in different ways:

Numerical simulation of the heat diffusion in the glass and of the convective cooling on the surface of the structured glass, Experimental determination of a convective cooling exchange coefficient on a structured glass sample at moderate temperature and extrapolation to high temperatures. This method makes it possible to estimate $q_{surface}$ values as a function of the convection intensity, for example with air blowing nozzles.

These 2 methods also make it possible to take account of the geometry of the print roller. In practice, for a large diameter roller, the cooling immediately after the printing point becomes difficult. A smaller roller diameter improves the situation but shortens the contact time and therefore the time available for filling the etching of the roller with the glass. A cooling of the roller which reduces its temperature relative to the temperature of the glass also contributes to the cooling of the glass for the fixing, but it risks reducing the temperature of the glass before and during the filling of the etching.

If it is difficult to obtain a significant cooling of the glass solely via the surface, it may be highly advantageous to obtain an additional cooling by a gradient toward the volume of the glass. Such a gradient can be obtained during the thermal conditioning of the strip. We will present a few examples later.

The heat flux dissipated toward the volume through the plane at the depth of the print $q_{volume}|_{x=dimp}$ therefore depends on the thermal gradient immediately after the printing. This gradient depends on the temperature profile in the thickness during the printing which is determined by the thermal conditioning before printing. To design and engineer the thermal conditioning correctly according to the required cooling rate, a method for determining the thermal gradient and the flux $q_{volume}$ as a function of said thermal conditioning is therefore sought. Obviously, a numerical simulation of the thermics of the strip can be used, or trial and error, but these methods are largely inappropriate in a design process.

It is therefore essential to find a rapid method for quantifying $q_{volume}$ immediately after the printing.

Such a reinforcing of the cooling demands a negative gradT≤0 at the printing depth at the moment of printing. This gradient is to be created by a heating of the surface in thermal conditioning. The patent FR2934588 teaches the engineering of such a heating as a function of the initial temperature of the strip T1 and the targeted print temperature. The proposed method makes it possible to determine heating length and therefore time $t_{ch}$ and to calculate the heat flux to be injected into the glass. It also makes it possible to determine the maximum temperature reached at the end of the heating $T_{max}$ and to specify the distance and therefore the delay $t_{dist}$ between the heating and the printing point. However, the patent FR2934588 does not teach how to determine the temperature profile in the thickness, or the heat flux in the volume generated by the surface heating. The combination of a condition at the "heating" limits with a condition at the "adiabatic" limits between the heating and the printing point does not allow for a simple symbolic solution to calculate the temperature profile as a function of time and deduce therefrom the value $q_{volume}$ immediately after the printing. A series of numerical simulations of different situations have, on the other hand, enabled us to determine a simple equation for estimating $q_{volume}$:

$$q_{volume}|_{x=dimp} = \lambda \cdot \frac{0.0718 \cdot d_{imp} \cdot (T_{max} - T1) \cdot \sqrt{t_{ch}}}{t_{dist} \cdot \alpha \cdot \sqrt{t_{dist}}} \cdot \exp\left(-\frac{0.147 \cdot d_{imp}^2}{t_{dist} \cdot \alpha}\right)$$

In this equation, $\lambda$ represents the thermal conductivity and $\alpha$ the thermal diffusivity of the glass. Values of $\lambda=1.5$ W/mK and of $\alpha=4.4\times10^{-7}$ cm$^2$/s are representative for clear soda-lime glass and for the temperatures during the printing. The other parameters have been presented hereinabove.

With this equation, it is possible to estimate the volume heat flux density at the position of the printing with the surface heating parameters previously determined by the equations given in FR2934588.

It is also possible to estimate with this equation, for $q_{volume}$, the reduction of the flux by equalization of the thermal profile immediately after printing. To this end, an additional delay, for example 0.5 sec, is added after $t_{dist}$. The simulations of a number of thermal conditioning situations have demonstrated that the flux $q_{volume}$ drops rapidly after the printing. However, calculation of the creep with the enlargement of the radius R as a function of time R(t) according to the formula presented previously also shows that the critical phase of the fixing corresponds to the period immediately after the printing and demolding. At this moment, it is very difficult to cool the printed structure via the surface because of the roller. The volume cooling is therefore a crucial element for the fixing of the precision structures.

Finally, with this determination of the fluxes $q_{volume}$ and $q_{surface}$, the cooling rate TR is determined and a check is carried out to see if the targeted value is obtained. It would be possible, if necessary, to also determine fluxes $q_{volume}$ and $q_{surface}$ as a function of time and therefore plot TR as a function of time. This makes it possible to check whether the TR value is in particular sufficiently high immediately after the printing.

If a lack of cooling is observed immediately after the printing, either the print temperature can be reduced or the thermal gradient reinforced by a lowering of the initial temperature of the strip and a reinforced heating. Shortening the lengths of the heating and the heating—printing point distance also makes it possible to increase $q_{volume}$ immediately after the printing.

Optimizing the Etching Method

We have seen previously that the creation of the precision structures entails adjusting the parameters of the following three steps:
1. thermal conditioning
2. printing of the structure
3. fixing of the structure Each of these steps has a certain complexity when it comes to determining the appropriate parameters. Furthermore, the parameters of the three steps are interconnected. Identifying a set of these parameters which allows the method to operate correctly, while observing the targeted structure precision, demands an appropriate determination method.

Figure 1:
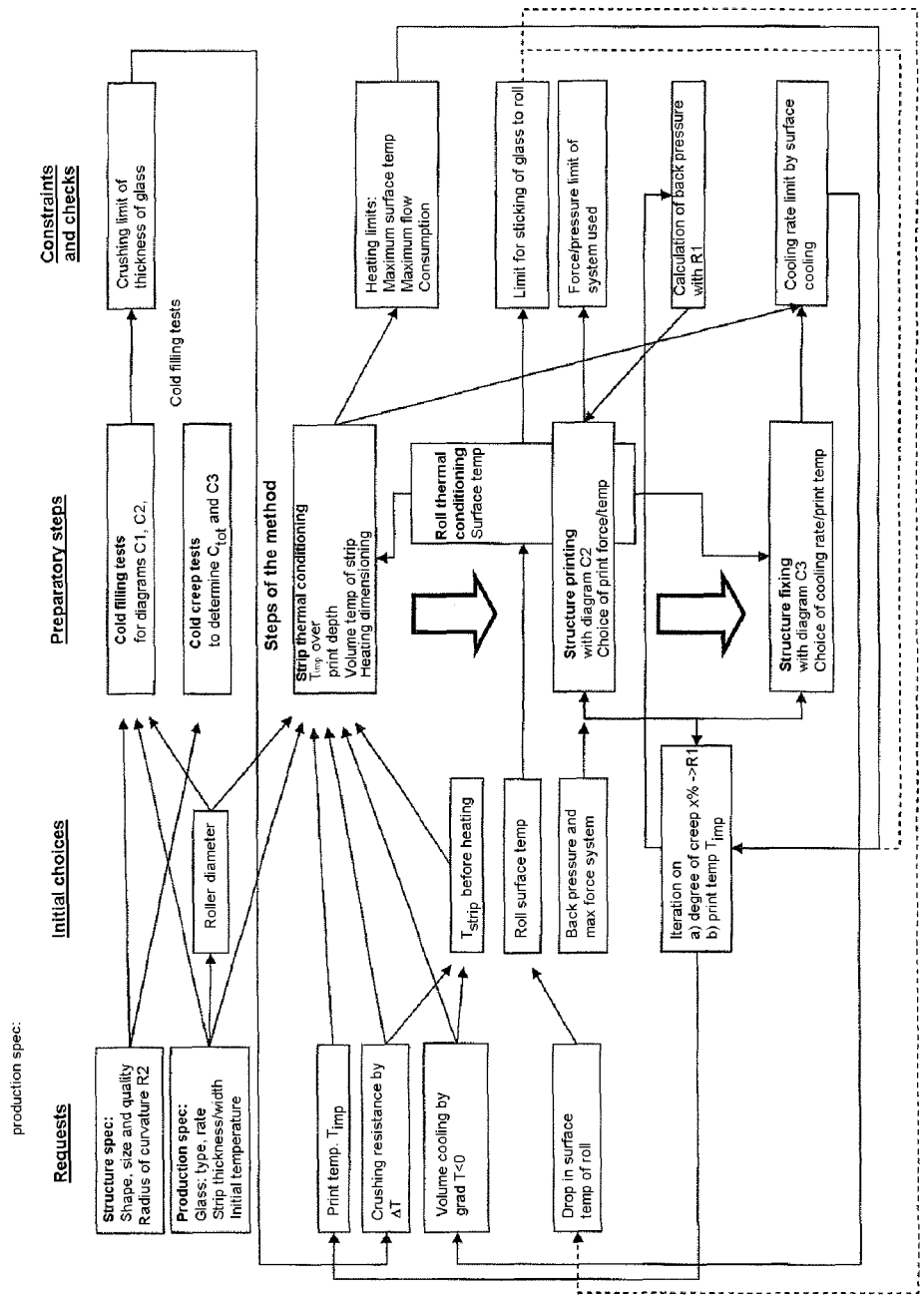
FIG. 1 is a flow diagram graphically representing the links between the various steps of the method of the invention.

The flow diagram of FIG. 1 is used to graphically represent the links between the various steps of the process. It describes a systematic approach that can be used to define all the parameters needed to produce a precision structure according to a given specification. It also makes it possible to check whether the required structure can be produced according to the technical devices made available.

The invention makes it possible to specify the parameters of the different steps for creating the structure by an iterative process.

The left-hand column contains the various demands external or intrinsic to the method. The middle column contains the various steps of the method in the order in which they proceed, the latter corresponding to the progress of the glass. The right-hand column contains the constraints due to the techniques available for implementing the method and the limit values of the parameters of the method.

We will now work step-by-step through this optimization flow diagram by an exemplary route.

0. Specification: The specification specifies the shape, the size and the quality of the desired structure, in particular the accepted radius of curvature R2. This specification also specifies the production parameters to be observed such as the rate and thickness of the strip, the temperature of the glass upstream of the printing process and the type of glass.

1. Choice of the roller diameter according to the technological constraints such as the width of the strip affecting the deflection, the material and the design of the roller, and so on, and calculation of the length of the half-segment of the molding between glass and etching roller.
2. Cold filling tests on the targeted structure with a model roller. These tests are used to determine the printing diagrams C1 and C2.
3. Cold creep tests to determine the coefficient $C_{tot}$ then calculation of a set of curves for the diagram C3.
4. Choice of the value x % for the degree of creep, from which is derived the value R1, to anticipate the creep, from the curves available in the diagrams C2 and C3, and choice of the initial value of the print temperature.
5. Structure printing: determination of the printing force FL in the diagram C2 to achieve the value x % of the targeted degree of creep, and therefore the radius R1.
6. Calculation of the counter-pressure linked to the radius of curvature R1.
7. Force limit check: the force retained will be less than or equal to the force that can be technically produced by the technology implemented.
8. Crushing check: if, when determining the diagram C1, it is observed that there is a risk of crushing of the thickness of the glass, the demands for thermal conditioning are supplemented with an adequate ΔT between the volume of the glass and the layer to be printed.
9. Structure fixing: in the diagram C3, the cooling rate needed to obtain the radius of curvature R2 is determined with the temperature $T_{imp}$, according to the degree x % of creep retained in the step 5.
   The distance over which it is necessary to maintain this cooling rate is obtained by calculating the trend of the targeted radius using the formula R=f(t) seen previously, for different creep times so as to identify the ceiling of the value. From the ceiling start time, the structure no longer degrades, and it is therefore no longer necessary to maintain this cooling rate. From this time, and taking into account the rate of the glass, the necessary cooling length is deduced therefrom.
10. Cooling rate limit check: a check is carried out to see if the necessary surface heat flux can be obtained with the available cooling means. If there is a problem, various solutions exist for reducing the cooling requirement:
    a. The print temperature is lowered which reduces the demand for cooling and the steps 5-9 are repeated.
    b. The degree of creep x % is slightly increased which reduces the necessary radius of curvature R1, and the steps 5-9 are repeated.
11. Volume cooling demand: if the previous iteration did not make it possible to obtain a viable set of parameters, the volume cooling demand is added. This results from a thermal gradient obtained by a prior thermal conditioning of the strip of glass.
12. Choice of the roller surface temperature as a function of the print temperature and of the structure cooling requirement. If necessary, a thermal conditioning of the roller is performed by providing a heating of the surface of the roller just before the contact with the glass and a cooling of the surface of the roller just after etching.
13. Check on the risk of sticking of the glass to the roller as a function of the temperature of the glass, of the surface of the roller, the surface material, the contact time and pressure. The measures that can be used to limit the risk of sticking have already been described. If there is a risk of sticking, the temperature $T_{imp}$ is reduced and the method returns to the step 6. Another solution consists in lowering the roller surface temperature. This may entail compensation for the cooling effect on the glass by the roller by a slight increase in the heat flux from the heating of the strip to maintain $T_{imp}$.
14. Thermal conditioning of the strip: design and engineering of the thermal conditioning making it possible to obtain the print temperature $T_{imp}$ over a sufficient thickness, by making the temperature uniform or heating the surface to be printed. This choice will be made based on the temperature of the glass according to the type of production (float or rolling). The engineering of the conditioning will be done according to the rules described in the thermal conditioning section. If the demand incorporates a ΔT to avoid crushing of the thickness and/or a creation of a gradient gradT<0 to reinforce the cooling, the thermal conditioning includes a surface heating engineered according to the rules described previously.
15. Heating check: in the context of the engineering of the surface heating, values are obtained for the density of the heat flux to be obtained in the glass, the energy consumption, the length of the region to be heated and the maximum surface temperature that can be allowed at the end of the heating. A check is carried out to see if the values obtained are acceptable and technically achievable with the means available. If there is a problem, it is possible, for example, to reduce the print temperature and recommence the iteration at the step 5.
16. Volume cooling check: a check is also carried out to see if the addition of the volume cooling to the surface cooling makes it possible to obtain the targeted TR. In the event of a problem, it is possible, for example, to reduce the print temperature and recommence the iteration at the step 5. Another method involves reinforcing the thermal gradient in the glass to increase $q_{volume}$. Such a reinforcing can be obtained in a number of ways: a) lowering the initial temperature T1 of the strip and reinforcing the heating. b) Shortening the lengths of the heating and of the heating—printing point distance within the context of the rules defined by the document FR2934588. The iteration is then recommenced at the step 13.

It should be noted that the order of the parameter optimization steps may differ from that described above.

At the end of this iteration, there is a set of parameters available that make it possible to carry out the printing method for the targeted structure, suited to the various constraints. From this set of parameters, it is possible to engineer the etching system, in particular for the preliminary thermal conditioning of the glass, the printing and the fixing.

In the case where it is not possible to obtain operating parameters with the device initially provided, one of the determining parameters of the system must be changed, for example the contact time between the roller and the glass. There are two possibilities for increasing the contact time between the strip and the roller:

a. enlarging the diameter of the roller, keeping a careful eye on the interaction with the thermal conditioning upstream of the roller and the cooling downstream.
b. inducing a local curvature of the strip around the roller.

In these two cases, it is necessary to determine a new diagram C1 and C2 and then repeat the iteration process from the step 1.

As an alternative, the installation can be modified, for example by the use of a more powerful surface cooling method, for example with air previously cooled below the ambient temperature, a fog of water or another gas such as hydrogen. However, these techniques considerably increase the complexity and the technical difficulty involved in the cooling.

In the case where it is not possible to obtain operating parameters that can be produced on the installation for the targeted structure, another structure will be sought that best addresses the required function and that can be produced on the installation.

Optimization Principles for Obtaining Precision Structures

The flow diagram of FIG. 1 demonstrates the interaction of the many parameters which determine this precision structure printing method. The difficulty in optimization depends on the shape, the size of the structure and the precision required. The creep diagram of the sinusoidal structures with different radii of curvature, FIG. 2, clearly reveals the simplicity in creating structures with large radii and the difficulty in obtaining small radii of curvature.

The structure with a 220 µm radius of curvature exhibits very weak smoothing, even at a low cooling rate. The structure with a 2.2 µm radius of curvature almost disappears at a low cooling rate. Its conservation therefore requires a very high cooling rate.

For the development of a structure with large radius, the operating parameters window is very large. A viable set of parameters can fairly easily be found.

For the development of a structure of small size with small radius of curvature, the window for a viable set of parameters may be very small—or nonexistent.

The systematic approach proposed in the flow diagram makes it possible to find this operating parameters window and also makes it possible to make the right choices concerning the technologies to be put in place to achieve the required parameter values such as the printing force FL or the cooling rate TR.

Exemplary Application of the Invention
Optimization Procedure:

0. Specification: Production: Rolled glass line of 145 t/j of soda-lime glass for covering photovoltaic panels, with a thickness of 3.2 mm, raw strip width 2.5 m, rate of 5.1 m/min. Temperature of the glass at the output of the casting unit approximately 900° C. The structure is to be produced on the top face of the strip. Structure to be created: a sawtooth structure illustrated by FIG. 29, formed by a succession of triangular edges with a vertex angle of 60°, of height H=0.866 mm, of width at the base of 1 mm. For a strip thickness of 3.2 mm, the thickness of the glass at the bottom of the valley of the structure is equal to 2.77 mm. For this structure, the initial average height of the glass involved in the printing corresponds to half the height of the structure, or 0.43 mm. This implies a minimum depth of $d_{imp}$=0.43 mm to be heated to the print temperature $T_{imp}$. Precision required concerning the geometry of the structure: the average of the negative radii of curvature in the recesses and positive radii of curvature in the peaks should not exceed 25 µm. For this photovoltaic panel application, the targeted structuring is used to reduce the reflection of light by a "light trapping" effect. To guarantee a good effectiveness of the structure obtained, the surfaces that do not follow the desired inclination planes must be very limited. In relation to a projection in the plane of the sheet of glass, the nonconforming surface should not exceed approximately 10%. The average radius of curvature of the tops and the recesses should therefore be less than approximately 25 µm. Furthermore, the radii of curvature should remain greater than 10 µm to avoid mechanical stability problems in the sheets and allow them to be tempered.

1. Definition of the roller: the etching roller retained is made of steel and its surface is chrome-plated to avoid adhesion of the glass. It is manufactured with a matrix whose radii of curvature are 10 µm so that the minimum radius of curvature of the structure cannot be less than 10 µm. For a print width of 2.5 m, a roller diameter of 150 mm is chosen. This diameter ensures, in conjunction with the thick walls, a good rigidity against deflection. The deflection can be further reduced for example by double bearings. This limited diameter also makes it possible to reduce the distance from the heating to the printing point to approximately 50 mm. The surface cooling nozzles can also be brought closer to the printing point. For this roller, the length of the half-segment of the molding between glass and etching roller gives 9 mm.

2. Cold filling tests: plotting of a first diagram C1 for obtaining radii of curvature with paste shows a limitation to a high value of the radii of curvature of the imprint and a significant reduction in the thickness of the sheet of paste. A second series of tests with a reduced paste thickness, approximately 0.5 mm, makes it possible to plot a new diagram C1 that is not disturbed by crushing, and then the diagram C2 (FIG. 30).

3. Cold creep tests: the tests carried out according to the method described previously, for the targeted geometry, make it possible to determine a value of the coefficient $C_{tot}$ at 0.6. With this value introduced into the following formula, the diagram C3 (FIG. 33) is determined by calculating the necessary cooling rate as a function of the temperature for different degrees of creep.

$$TR = C_{tot} \cdot \frac{\gamma}{\mu(T_{imp})} \cdot \frac{F_{vis}}{R2 \cdot x\%} \cdot \ln(2)$$

4. Choice of the creep value X % and of the print temperature: in light of the diagrams C2 and C3, a degree of creep value of 10% and a print temperature of 870° C. are chosen as initial data. This 10% value leads to a radius of curvature R1 of 22.5 µm, R1=R2×(1−10%).

5. Verification of the impact of the radius of curvature on the counter-pressure: calculation of the local pressure under the edge with 22.5 µm gives a value of 13 kPa.

6. Determination of the printing force FL: from the diagram, for a temperature of 870° C. and a degree of creep of 10%, we obtain a printing force of 2570 N/ml. With the length of the molding segment of 9 mm, we obtain an average pressure of 276 kPa. A slight increase in the force by 5% makes it possible to anticipate the counter-pressure of 13 kPa. The corrected force rises to 2700 N/ml.

7. Verification of the technical feasibility of implementing the printing force: this printing force value can easily be achieved, for example, by a jet of air bearing on the face of the strip opposite to the etching.

8. Crushing check: the reduction of the thickness of the sheet is confirmed by the result obtained by the calculation of the crushing according to the formula:

$$\Delta e = FL \cdot \frac{1}{vit \cdot \mu}$$

For a temperature of 870° C. corresponding to a viscosity of 42 800 Pa·s, and a X % value of 10%, a force of 2700 N/ml gives a result of 131% which indicates that these conditions are not achievable. The result of this is that the temperature of the volume must be lowered so as to limit the crushing. In order to limit the reduction of the thickness of the glass during structuring and use the force exerted by the roller to structure rather than crush the strip, parameters are sought which lead to a reduction in the thickness of the strip that is limited to 4%. Still using this formula, the search for a viscosity that makes it possible to limit the 4% sheet thickness reduction gives an equivalent temperature in the volume of 765° C.

9. Fixing of the structure and definition of the cooling rate: from the diagram C3, for a print temperature of 870° C. and a creep rate of 10%, we obtain a cooling rate of 101 K/sec. From the formula below, the trend of the radius of curvature as a function of time is calculated. The curve obtained shows that most of the creep occurs during the 0.4 sec following printing. For a strip rate of 5 m/min, the length over which it is necessary to maintain a cooling rate of approximately 100 K/sec is therefore 4 cm.

$$R(t) = R1 + C_{tot} \cdot \frac{\gamma}{\mu(T_{imp})} \cdot \frac{F_{vis}}{TR} \cdot \left[ \ln\left(e^{\frac{t \cdot TR \cdot 2}{F_{vis}}} + 1\right) - \ln(2) \right]$$

10. Verification of the cooling rate: from the formula below, the heat flux density to be dissipated is calculated:

$$q_{tot} = \frac{mass}{surface\ area} \cdot cp \cdot TR$$

For a cooling rate of 100 K/sec, a flux of 120 kW/m² is obtained, which is difficult to obtain by surface cooling immediately after printing because of the presence of the etching roller. It is therefore necessary to provide a volume cooling.

11. Volume cooling: to define the volume cooling rate, we assume that the flux dissipated by the surface cooling is limited to approximately 20 kW/m² just after printing. The flux to be dissipated by the volume cooling is therefore 100 kW/m².

12. Choice of roller temperature: the roller temperature retained is 600° C. This also contributes to the cooling of the strip by contact and radiation. Before printing, this cooling effect must be compensated by the design of the heating, for example by a sweep with flue gases in the space situated between the strip and the roller.

13. Check on the risk of sticking: since the roller is chrome-plated, its temperature limited to 600° C. makes it possible to avoid any risk of sticking of the glass at 870° C.

14. Thermal conditioning of the strip: this conditioning is intended to ensure:
   A print temperature of 870° C.,
   A volume cooling rate of 100 kW/m² by means of a volume temperature gradient,
   A temperature difference between the layer to be printed and the volume of the glass to avoid its crushing.

For a strip at an initial temperature of 900° C., we know that it is necessary to cool it to a maximum temperature of 765° C. to limit its crushing during printing. The thermal conditioning according to the invention will therefore comprise a cooling of all of the strip and a surface heating of the face to be etched.

The engineering of the heating is performed as described in the patent FR2934588. We use the following input data:
   a print number of 0.3 mm⁻¹,
   a distance between the end of the heating and the printing point of 50 mm,
   a depth to be heated of 0.43 mm,
   a temperature of 765° C.
We obtain the following results:
   a heating length of 280 mm,
   a maximum surface temperature of 938° C.,
   a net heat flux density in the glass of 200 kW/m².

15. Verification of the heating parameters: the values obtained in the preceding step are reasonable and achievable.

16. Volume cooling check: from the values obtained when engineering the heating, the volume flux immediately after printing is calculated using the formula introduced previously. A value of 67 kW/m² is obtained, which is less than the 100 kW/m² needed to ensure the cooling rate required for the fixing of the structure.

17. Loop back: A loop back is necessary by lowering the temperature of the strip in the step 13 so as to obtain a cooling rate of 100 kW/m². We obtain a strip temperature of 700° C. By then repeating the step 13 with this strip temperature, we obtain the following output data:
   a heating length of 280 mm,
   a maximum surface temperature of 981° C.,
   a net heat flux density in the glass of 320 kW/m².

18. Verification of the heating parameters: the values obtained in the preceding step are reasonable and achievable.

19. Summary of the parameters retained: the optimization process according to the invention has made it possible to define the appropriate parameters for producing the targeted structure, in particular with a radius of curvature R2 of between 10 and 25 µm. These parameters are:
   Print temperature: 870° C.,
   Core temperature: 700° C.
   Linear force applied for the etching: 2700 N/ml
   Radius R1: 22.5 µm
   Cooling rate immediately after printing: 100 kW/m²
   Surface heating before printing:
      length to be heated: 280 mm
      net flux: 320 kW/m²

Exemplary Device According to the Invention

The diagram of FIG. 15 shows an exemplary device according to the invention, on a rolled glass line.

The strip of glass J is formed between two rollers 23a, 23b, at the output of the conditioning channel. These rollers are cooled with water which immediately induces a thermal profile in the strip with a heat reserve at the center.

According to this example, the strip formed is then transported to a levitation table 24 and then to rollers 31. The thermal conditioning of the strip, according to the invention, begins with a convection cooling 25 that makes it possible to obtain the average temperature of the strip before the surface heating of the face to be etched. For another exemplary application, a radiative cooling may be sufficient.

A thermal insulation 26 of the face to be etched makes it possible to make the temperature profile uniform over a sufficient thickness. A heating means 32 is used to heat the face to be etched. Examples of heating means are described in the patent FR2934588. The cooling 25 on the opposite face maintains the thermal gradient in the volume of the strip.

The etching roller 27 exerts a pressure on the strip counterbalanced by a counter-pressure roller 28 placed on the opposite face. According to another exemplary embodiment of the invention, the counter-pressure roller is replaced by a jet of air. The etching roller 27 is advantageously close to the print temperature to ensure that its imprints are filled. The printing is immediately followed by convective cooling by air jets 29.

A reinforcing of the cooling, for example by the addition of a fog of water, may be provided, in particular in the first blowing nozzle.

The strip with its precision structure then passes into a controlled cooling tunnel 30 to limit the stresses of the glass after it has passed below its transformation temperature.

The invention makes it possible to continuously print a precision structure on a strip at a rate greater than 1 m/min, by means of:
- the design of the appropriate thermomechanical treatment method for achieving this objective,
- a procedure that makes it possible to optimize all the parameters of the method to address the specific needs of a precision structure.

Examples of Thermal Implementations of the Method

We will now discuss various examples of thermal conditioning and cooling resulting from implementations of the method according to the invention.

Exemplary Application with Prior Thermal Conditioning to Obtain a Strip that is Uniform in Temperature at the Time of Printing:

A smooth strip of extra-clear glass leaves a casting unit at 5.1 m/min with a thickness of 3.2 mm. An etching roller is placed at a distance corresponding to a delay of 6 sec, or 51 cm. For a rate of 10 m/min, the length between the casting unit and the etching roller would be 100 cm.

The initial average temperature of the glass, at the output of the casting unit, is approximately 900° C. The initial thermal gradient in the strip at the output of the casting unit is not taken into account in the calculations, bearing in mind that any possible gradient fades away within a delay of approximately 1 sec.

FIG. 3 shows the trend of the temperatures of the strip resulting from the fluxes retained. FIG. 4 shows the trend of the flux densities retained for the calculation, on both faces of the strip. The diagram of FIG. 5 shows the temperature profile in the thickness of the strip for different steps of the method, from the time of printing, corresponding to 6 sec, to the 6.4 sec instant.

In the graph of FIG. 3, the "temp at depth $d_{ump}$" dotted line curve represents the temperature trend at a depth of 0.4 mm, corresponding in the example to the print depth.

In this example, and in the following examples, the temperature on the print layer of 850° C. is considered as the appropriate temperature for printing the structure.

In this example, the conditioning consists in thermally insulating the two faces of the strip upstream of the etching roller.

It can be seen from the diagram of FIG. 3 that the temperatures in the thickness of the strip become constant and uniform before 6 sec.

The etching roller is maintained at a temperature slightly below that of the strip which limits the heat losses from the surface of the strip on approaching the roller.

For approximately 0.2 sec after the etching, corresponding to a distance of 2 cm, the surface of the strip is still concealed by the roller which greatly limits the surface cooling. The cooling rate obtained is thus 35 K/sec at 6.2 sec.

Then, a convective cooling lowers the temperature of the etched surface with a maximum flux of 200 kW/m$^2$. With this post-printing cooling flux, a rapid temperature drop of the face of the strip is obtained.

As the graph of FIG. 5 shows, the cooling level is more intense than that obtained at the output of a casting unit which is made possible by the absence of heat reserve at the center of the strip.

Exemplary Application with Prior Thermal Conditioning so as to Obtain a Temperature Gradient at the Time of Printing:

In this example, the conditioning consists in thermally insulating the face to be etched and in strongly cooling the opposite face of the strip upstream of the etching roller.

It can be seen in FIG. 6 that a temperature difference is obtained between the two faces of the strip of approximately 150° C. at the time of printing, at 6 sec and a temperature that is substantially uniform on the side of the face to be etched is obtained.

With the same post-printing cooling flux as the preceding example, a temperature drop is obtained after the etching that is slightly greater than the preceding example on the etched face of the strip. The cooling rate obtained after printing is approximately 50 K/sec at 6.2 sec.

As FIG. 8 shows, the saving compared to the result obtained with the preceding example is explained by an identical temperature profile over the print thickness, at 0.4 mm.

This exemplary application may be of interest in cases where there is a desire to limit the crushing of the thickness of the strip during the etching.

Exemplary Application with Prior Thermal Conditioning Including a Top-Up Heating:

In this example, the conditioning consists in first strongly cooling the two faces of the strip and then slightly reheating the face to be etched upstream of the etching roller.

It can be seen in FIG. 9 that a temperature difference is obtained between the two faces of the strip that is greater than 150° C. at the time of printing, but, most importantly, a continuous thermal gradient toward the interior from the surface to be etched is also obtained.

With this thermal conditioning, the cooling rate obtained is thus approximately 60 K/sec at 6.2 sec.

As FIG. 11 shows, at the time of printing, there is a significant temperature gradient over the print thickness and in the volume. This explains the increase obtained on the cooling rate immediately after printing, at 0.2 sec.

To further increase the cooling rate, it will be necessary to more strongly cool the strip upstream of the heating, for example to 700° C. as described in the exemplary application.

In the following example, the strip is even colder which leads to very high cooling rates.

Exemplary Application for a Float Glass Strip at 600° C. with Prior Thermal Conditioning Comprising an Intense Heating of the Face to be Etched:

In this example, with a strip advancing at 16 m/min, a typical rate for float glass, the conditioning consists in strongly reheating the face to be etched upstream of the etching roller so as to raise the temperature of the print thickness to approximately 850° C. at the time of printing at 5.5 sec.

With this thermal conditioning, the cooling rate obtained is thus approximately 250 K/sec at 5.7 sec (FIG. 12).

As FIG. 14 shows, at the time of printing, there is a very significant temperature gradient over the print thickness and in the volume. It can be seen that 0.4 sec after printing, at the time 5.9 sec, the heat is still dissipated via the surface and to the volume of the strip in the print thickness.

As FIG. 13 shows, the heat flux dissipated by the surface after the printing is approximately 200 kW/m², a value similar to the preceding cases.

A cooling rate of 250 K/sec makes it possible to conserve a very thin structure, with radii of curvature less than approximately 10 µm, for a very high rate of advance of the glass.

The choice of the means to be implemented to obtain the targeted structure depends on the prior analysis performed according to the flow diagram described previously.

The invention claimed is:

1. A printing method for obtaining a precision structure including protruding regions and recessed regions, of which a smallest radius of curvature (R2) of the protruding regions is less than 200 µm, on at least one of the faces of a flat glass advancing continuously at a rate of at least 1 m/min, using a structured tool having surface imprints, wherein:
    providing a thermal conditioning upstream of a printing position to ensure a print temperature $T_{imp}$ for the strip over a print thickness,
    performing printing with a force FL applied by the structured tool to the glass so as to obtain a radius of curvature (R1) less than (R2) to anticipate the increase in the radius of curvature from (R1) to (R2) associated with the creep after removal of the structured tool,
    performing cooling with a cooling rate TR causing the radius (R1) to change to a radius less than or equal to (R2).

2. The method as claimed in claim 1, wherein the print temperature $T_{imp}$ is determined by a combination of a first diagram (C2) of a filling of the surface imprints by the glass to produce the protruding and recessed regions, and a fixing diagram (C3) of a fixing of the surface imprints in the strip.

3. The method as claimed in claim 2, wherein:
    a limited degree of creep, x %=(R2−R1)/R2, is chosen to be less than or equal to 50%;
    then, a printing force FL is chosen;
    with a curve ($G_{imp}$) of the filling diagram (C2), representing temperature/linear force pairings for obtaining the desired final radius of curvature R2, the print temperature $T_{imp}$ is found;
    with a curve ($G_{flux}$) of the fixing diagram (C3), representing cooling rate/temperature limit pairings for obtaining the TR to be produced for the print temperature $T_{imp}$.

4. The method as claimed in claim 3, wherein the degree of creep, x %, is chosen such that the values of $T_{imp}$, FL and TR are within heating, printing force and cooling rate capabilities of an installation for imprinting glass.

5. The method as claimed in claim 1, wherein the radius (R1) is obtained by totally filling the surface imprints with glass.

6. The method as claimed in claim 1, wherein the radius R2, corresponding to the increase in the radius of curvature (R1) by creep, is estimated by the following formula $$R2 = R1 + C_{tot} \cdot \frac{\gamma}{\mu(T_{imp})} \cdot \frac{F_{vis}}{TR} \cdot \ln(2)$$

wherein,
$\gamma$ is the surface tension,
R1 is the initial radius of curvature of the print,
R2 is the radius of curvature after increase,
$C_{tot}$ is a representative coefficient for the creep of a particular structure,
$F_{vis}$ is a constant,
$\mu$ represents the viscosity,
TR represents the cooling rate, and
ln(2) is the neperian logarithm of 2.

7. The method as claimed in claim 6, wherein the representative coefficient $C_{tot}$ for the creep of a particular structure is determined by the formula:

$$C_{tot} = F_{RL} \cdot \frac{C_{geo}}{R}$$

in which the radius R is a factor which characterizes the size of the structure, $C_{geo}$ the shape and $F_{RL}$ the limiting conditions for the creep of a particular edge.

8. The method as claimed in claim 6, wherein the coefficient $C_{tot}$ is taken to be equal to 0.4 for a structure of sinusoidal form.

9. The method as claimed in claim 1, wherein, for a constant temperature, and therefore a constant viscosity, the radius R2 is given by a simplified form of the creep formula $$R2 = R1 + C_{tot} \cdot \frac{\gamma}{\mu} \cdot \Delta t$$

such that a creep measurement during a time period $\Delta t$ on a material with a known ratio $\gamma/\mu$ makes it possible to determine the coefficient $C_{tot}$ of a particular structure.

10. The method as claimed in claim 1, wherein the cooling rate TR, which leads to a targeted degree of creep x %=(R2−R1)/R2 between R1 and R2, is determined by the following formula, for a given structure, as a function of the print temperature $T_{imp}$ $$TR = C_{tot} \cdot \frac{\gamma}{\mu(T_{imp})} \cdot \frac{F_{vis}}{R2 \cdot x\%} \cdot \ln(2)$$

wherein,
$\gamma$ is the surface tension,
R1 is the initial radius of curvature of the print,
R2 is the radius of curvature after increase,
$C_{tot}$ is a representative coefficient for the creep of a particular structure,
$F_{vis}$ is a constant, and
$\mu$ represents the viscosity.

11. The method as claimed in claim 1, wherein the limit curve ($G_{imp}$) corresponding to the pairs of values (temperature/linear force) that make it possible to obtain the desired radius of curvature, before glass creep, is established with a paste having a viscosity close to that of the glass at the print temperature, but with a surface tension lower than that of the glass at this print temperature.

12. The method as claimed in claim 1, wherein the thermal conditioning is preliminarily determined to ensure, in the strip, at the level of the etching roller, a temperature gradient of at least 10° C. between the hotter surface to be etched and the less hot mid-thickness of this glass strip.

13. The method as claimed in claim 12, wherein to etch a strip of float glass, the thermal conditioning includes heating of the face to be etched to bring it to a print temperature greater than that of the core of the strip.

14. The method as claimed in claim 13, wherein for etching a strip of glass, the temperature profile obtained in the thickness of the glass after the thermal conditioning is decreasing from the face to be etched to the opposite face.

15. The method as claimed in claim 12, wherein to etch a strip of rolled glass, the thermal conditioning includes a cooling of the strip on the face opposite the one having to be etched, to cool the core of the strip.

16. A print device making it possible to obtain a precision structure including protruding regions and recessed regions, of which a smallest radius of curvature (R2) of the protruding regions is less than 200 µm, on at least one of the faces of a flat glass advancing continuously at a rate of at least 1 m/min, wherein the device comprises:
- a thermal conditioning area, programmed to provide a thermal conditioning upstream of a printing position to ensure a print temperature $T_{imp}$ for the strip over a print thickness;
- a structured tool for etching the glass, programmed to imprint the glass with a force FL applied by the structured tool to the glass so as to obtain a radius of curvature (R1) less than (R2) to anticipate the increase in the radius of curvature from (R1) to (R2) associated with the creep after removal of the structured tool; and
- a surface cooling device, programmed to cool the glass with a cooling rate TR causing the radius (R1) to change to a radius less than or equal to (R2).

* * * * *